US012756771B2

(12) United States Patent
Krishnamurthy et al.

(10) Patent No.: US 12,756,771 B2
(45) Date of Patent: Oct. 6, 2026

(54) APPARATUS, METHOD, AND COMPUTER PROGRAM PRODUCT FOR OUTPUTTING A FIRST MULTICHANNEL COMPUTING PROGRAM TRANSMISSION PACKAGE AND A SECOND MULTICHANNEL COMPUTING PROGRAM TRANSMISSION PACKAGE

(71) Applicant: ATLASSIAN PTY LTD., Sydney (AU)

(72) Inventors: Varadharajan Krishnamurthy, Bangalore (IN); Falguni Chitkara, Bangalore (IN)

(73) Assignee: Atlassian Pty, Ltd., Sydney (AU)

( * ) Notice: Subject to any disclaimer, the term of this patent is extended or adjusted under 35 U.S.C. 154(b) by 13 days.

(21) Appl. No.: 19/092,581

(22) Filed: Mar. 27, 2025

(65) Prior Publication Data

US 2026/0303707 A1 Oct. 1, 2026

(51) Int. Cl.
*G06F 15/16* (2006.01)
*H04L 69/14* (2022.01)

(52) U.S. Cl.
CPC .................................... *H04L 69/14* (2013.01)

(58) Field of Classification Search
CPC ................................ H04L 69/14; H04L 65/00
USPC ................................. 709/227, 228, 230, 238
See application file for complete search history.

(56) References Cited

U.S. PATENT DOCUMENTS 7,331,049 B1 * 2/2008 Jin ....................... G06Q 10/107 709/201
2014/0059448 A1 * 2/2014 Lee ........................ G06Q 10/00 715/752
2015/0117335 A1 * 4/2015 Jeng ........................ H04L 67/62 370/329
2021/0044549 A1 * 2/2021 Renjith ................. H04L 67/125

* cited by examiner

*Primary Examiner* — Kaylee J Huang
(74) *Attorney, Agent, or Firm* — Alston & Bird LLP

(57) ABSTRACT

Apparatus, methods, and computer program products for a first multichannel computing program transmission package and a second multichannel computing program transmission package are provided herein. For example, a method may include receiving a set of multichannel computing program operational transmissions, generating a multichannel computing program operational graph structure, generating a first multichannel computing program transmission package and a second multichannel computing program transmission package, and outputting the first multichannel computing program transmission package and the second multichannel computing program transmission package.

20 Claims, 12 Drawing Sheets

APPARATUS, METHOD, AND COMPUTER PROGRAM PRODUCT FOR OUTPUTTING A FIRST MULTICHANNEL COMPUTING PROGRAM TRANSMISSION PACKAGE AND A SECOND MULTICHANNEL COMPUTING PROGRAM TRANSMISSION PACKAGE

BACKGROUND

Various methods, apparatuses, and systems provide tools to plan, update, execute, and monitor multichannel computing program transmission packages and interface components in multichannel computing program transmission orchestration environments. Applicant has identified a number of deficiencies and problems associated with tools for effectively, reliably, and securely managing multichannel computing program transmission packages and interface components in multichannel computing program transmission orchestration environments. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved methods, apparatuses, computer program products, and/or the like that are configured for effectively and efficiently outputting, in a multichannel computing program transmission system, one or more transmission packages, such as a first multichannel computing program transmission package and a second multichannel computing program transmission package.

In accordance with some exemplary embodiments of the present disclosure, an example apparatus for outputting a first multichannel computing program transmission package and a second multichannel computing program transmission package is provided. In some embodiments, the apparatus may comprise at least one processor and at least one memory including program code. In some embodiments, the at least one memory and the program code are configured to, with the at least one processor, cause the apparatus to receive a set of multichannel computing program operational transmissions. In some embodiments, a first multichannel computing program operational transmission of the set of multichannel computing program operational transmissions is received from a first multichannel computing program of a plurality of multichannel computing programs and a second multichannel computing program operational transmission of the set of multichannel computing program operational transmissions is received from a second multichannel computing program of the plurality of multichannel computing programs. In some embodiments, the at least one memory and the program code are configured to, with the at least one processor, cause the apparatus to generate a multichannel computing program operational graph structure. In some embodiments, the multichannel computing program operational graph structure comprises a plurality of multichannel computing program operational items and a plurality of multichannel computing program operational connections. In some embodiments, generating the multichannel computing program operational graph structure comprises generating a set of subsidiary multichannel computing program operational graph structures based on at least one of the set of multichannel computing program operational transmissions. In some embodiments, at least a first subsidiary multichannel computing program operational graph structure of the set of subsidiary multichannel computing program operational graph structures comprises at least one of the plurality of multichannel computing program operational items and at least one of the plurality of multichannel computing program operational connections. In some embodiments, the at least one memory and the program code are configured to, with the at least one processor, cause the apparatus to generate, using the multichannel computing program operational graph structure, the first multichannel computing program transmission package for the first multichannel computing program and the second multichannel computing program transmission package for the second multichannel computing program. In some embodiments, the at least one memory and the program code are configured to, with the at least one processor, cause the apparatus to output the first multichannel computing program transmission package to the first multichannel computing program and the second multichannel computing program transmission package to the second multichannel computing program. In some embodiments, the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels.

In some embodiments, generating the multichannel computing program operational graph structure may further comprise configuring a first multichannel computing program operational item of the plurality of multichannel computing program operational items based on a multichannel computing program operations augmentation feature. In some embodiments, the first multichannel computing program operational item may correspond to the first multichannel computing program.

In some embodiments, the first multichannel computing program operational item may comprise a multichannel computing program operational entity item.

In some embodiments, the first multichannel computing program operational item may be configured using multichannel computing program operational graph structure augmentation model.

In some embodiments, the first multichannel computing program transmission package may configure the first multichannel computing program to transmit the first multichannel computing program transmission object via the first multichannel computing program transmission channel based on a first multichannel computing program transmission setting and a first multichannel computing program transmission control.

In some embodiments, the at least one memory and the program code may be configured to, with the at least one processor, cause the apparatus to generate a multichannel computing program operational graph structure interface component. In some embodiments, the multichannel computing program operational graph structure interface component may comprise a multichannel computing program operational graph structure representation. In some embodiments, the at least one memory and the program code may be configured to, with the at least one processor, cause the apparatus to output the multichannel computing program operational graph structure interface component for rendering to a multichannel computing program transmission operations interface.

In some embodiments, the multichannel computing program operational graph structure representation may comprise a multichannel computing program operational item representation and a multichannel computing program operational connection representation.

In some embodiments, the set of subsidiary multichannel computing program operational graph structures may comprise a multichannel computing program operational technical graph structure. In some embodiments, to generate the multichannel computing program operational technical graph structure may comprise the program code being further configured to, with the at least one processor, cause the apparatus to extract a multichannel computing program technical feature from the first multichannel computing program operational transmission or the second multichannel computing program operational transmission. In some embodiments, to generate the multichannel computing program operational technical graph structure may comprise the program code being further configured to, with the at least one processor, cause the apparatus to generate a multichannel computing program operational technical item and a multichannel computing program operational technical connection based on the multichannel computing program technical feature and a multichannel computing program network configuration feature. In some embodiments, the multichannel computing program operational technical item may be one of the plurality of multichannel computing program operational items and the multichannel computing program operational technical connection may be one of the plurality of multichannel computing program operational connections.

In some embodiments, the set of subsidiary multichannel computing program operational graph structures may comprise a multichannel computing program operational entity graph structure. In some embodiments, to generate the multichannel computing program operational entity graph structure may comprise the program code being further configured to, with the at least one processor, cause the apparatus to extract a multichannel computing program entity feature from the first multichannel computing program operational transmission or the second multichannel computing program operational transmission. In some embodiments, to generate the multichannel computing program operational entity graph structure may comprise the program code being further configured to, with the at least one processor, cause the apparatus to generate a multichannel computing program operational entity item and a multichannel computing program operational entity connection based on the multichannel computing program entity feature and a multichannel computing program network operational feature. In some embodiments, the multichannel computing program operational entity item may be one of the plurality of multichannel computing program operational items and the multichannel computing program operational entity connection may be one of the plurality of multichannel computing program operational connections.

In some embodiments, the set of subsidiary multichannel computing program operational graph structures may comprise a multichannel computing program operational event graph structure. In some embodiments, to generate the multichannel computing program operational event graph structure may comprise the program code being further configured to, with the at least one processor, cause the apparatus to extract a multichannel computing program event feature from the first multichannel computing program operational transmission or the second multichannel computing program operational transmission. In some embodiments, to generate the multichannel computing program operational event graph structure may comprise the program code being further configured to, with the at least one processor, cause the apparatus to generate a multichannel computing program operational event item and a multichannel computing program operational event connection based on the multichannel computing program event feature. In some embodiments, the multichannel computing program operational event item may be one of the plurality of multichannel computing program operational items and the multichannel computing program operational event connection may be one of the plurality of multichannel computing program operational connections.

In some embodiments, the plurality of multichannel computing programs may comprise at least one of an object orchestration multichannel computing program, a technology operations multichannel computing program, or a software development multichannel computing program.

In some embodiments, the set of subsidiary multichannel computing program operational graph structures may be generated using a multichannel computing program operational graph structure preprocessing model.

In some embodiments, the multichannel computing program operational graph structure may be generated using a multichannel computing program operational graph structure model.

In accordance with another aspect of the present disclosure, an example method for outputting a first multichannel computing program transmission package and a second multichannel computing program transmission package is provided. In some embodiments, the method includes receiving a set of multichannel computing program operational transmissions. In some embodiments, a first multichannel computing program operational transmission of the set of multichannel computing program operational transmissions is received from a first multichannel computing program of a plurality of multichannel computing programs and a second multichannel computing program operational transmission of the set of multichannel computing program operational transmissions is received from a second multichannel computing program of the plurality of multichannel computing programs. In some embodiments, the method includes generating a multichannel computing program operational graph structure. In some embodiments, the multichannel computing program operational graph structure comprises a plurality of multichannel computing program operational items and a plurality of multichannel computing program operational connections. In some embodiments, generating the multichannel computing program operational graph structure comprises generating a set of subsidiary multichannel computing program operational graph structures based on at least one of the set of multichannel computing program operational transmissions. In some embodiments, at least a first subsidiary multichannel computing program operational graph structure of the set of subsidiary multichannel computing program operational graph structures comprises at least one of the plurality of multichannel computing program operational items and at least one of the plurality of multichannel computing program operational connections. In some embodiments, the set of subsidiary multichannel computing program operational graph structures is generated using a multichannel computing program operational graph structure preprocessing model. In some embodiments, the method includes generating, using the multichannel computing program operational graph structure, the first multichannel computing program transmission package for the first multichannel computing program and the second multichannel computing program transmission package for the second multichannel computing program. In some embodiments, the method includes outputting the first multichannel computing program transmission package to the first multichannel computing program and the second multichannel computing program transmission package to the second multichannel computing program. In some embodiments, the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels.

In some embodiments, generating the multichannel computing program operational graph structure may further comprise configuring a first multichannel computing program operational item of the plurality of multichannel computing program operational items based on a multichannel computing program operations augmentation feature. In some embodiments, the first multichannel computing program operational item may correspond to the first multichannel computing program.

In some embodiments, the first multichannel computing program operational item may comprise a multichannel computing program operational entity item.

In some embodiments, the first multichannel computing program operational item may be configured using multichannel computing program operational graph structure augmentation model.

In some embodiments, the first multichannel computing program transmission package may configure the first multichannel computing program to transmit the first multichannel computing program transmission object via the first multichannel computing program transmission channel based on a first multichannel computing program transmission setting and a first multichannel computing program transmission control.

In some embodiments, the method may include generating a multichannel computing program operational graph structure interface component. In some embodiments, the multichannel computing program operational graph structure interface component may comprise a multichannel computing program operational graph structure representation. In some embodiments, the method may include outputting the multichannel computing program operational graph structure interface component for rendering to a multichannel computing program transmission operations interface.

In some embodiments, the multichannel computing program operational graph structure representation may comprise a multichannel computing program operational item representation and a multichannel computing program operational connection representation.

In accordance with another exemplary embodiment of the present disclosure, a computer program product for outputting a first multichannel computing program transmission package and a second multichannel computing program transmission package is provided. In some embodiments, the computer program product includes at least one non-transitory computer-readable storage medium having computer-readable program code portions stored therein, the computer-readable program code portions comprising an executable portion. In some embodiments, the computer-readable program code portions comprising an executable portion are configured to receive a set of multichannel computing program operational transmissions. In some embodiments, a first multichannel computing program operational transmission of the set of multichannel computing program operational transmissions is received from a first multichannel computing program of a plurality of multichannel computing programs and a second multichannel computing program operational transmission of the set of multichannel computing program operational transmissions is received from a second multichannel computing program of the plurality of multichannel computing programs. In some embodiments, the plurality of multichannel computing programs comprises at least one of an object orchestration multichannel computing program, a technology operations multichannel computing program, or a software development multichannel computing program. In some embodiments, the computer-readable program code portions comprising an executable portion are configured to generate a multichannel computing program operational graph structure. In some embodiments, the multichannel computing program operational graph structure comprises a plurality of multichannel computing program operational items and a plurality of multichannel computing program operational connections. In some embodiments, generating the multichannel computing program operational graph structure comprises generating a set of subsidiary multichannel computing program operational graph structures based on at least one of the set of multichannel computing program operational transmissions. In some embodiments, at least a first subsidiary multichannel computing program operational graph structure of the set of subsidiary multichannel computing program operational graph structures comprises at least one of the plurality of multichannel computing program operational items and at least one of the plurality of multichannel computing program operational connections. In some embodiments, the computer-readable program code portions comprising an executable portion are configured to generate, using the multichannel computing program operational graph structure, the first multichannel computing program transmission package for the first multichannel computing program and the second multichannel computing program transmission package for the second multichannel computing program. In some embodiments, the computer-readable program code portions comprising an executable portion are configured to output the first multichannel computing program transmission package to the first multichannel computing program and the second multichannel computing program transmission package to the second multichannel computing program. In some embodiments, the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels. In some embodiments, the program orchestration operations execution incident interface component comprises a program execution incident action set link.

In accordance with another aspect of the present disclosure, an example apparatus for outputting a first multichannel computing program transmission package and a second multichannel computing program transmission package is provided. In some embodiments, the apparatus may comprise at least one processor and at least one memory including program code. In some embodiments, the at least one memory and the program code are configured to, with the at least one processor, cause the apparatus to receive a first multichannel computing program transmission setting for a first multichannel computing program of a plurality of multichannel computing programs and a second multichannel computing program transmission setting for a second multichannel computing program of the plurality of multichannel computing programs. In some embodiments, the at least one memory and the program code are configured to, with the at least one processor, cause the apparatus to receive a set of multichannel computing program operational transmissions. In some embodiments, a first multichannel computing program operational transmission of the set of multichannel computing program operational transmissions is received from the first multichannel computing program and a second multichannel computing program operational transmission of the set of multichannel computing program operational transmissions is received from the second multichannel computing program. In some embodiments, the at least one memory and the program code are configured to, with the at least one processor, cause the apparatus to identify a multichannel computing program operational action event associated with at least one of the plurality of multichannel computing programs. In some embodiments, the at least one memory and the program code are configured to, with the at least one processor, cause the apparatus to generate, using a multichannel computing program operational graph structure, a first multichannel computing program transmission control for the first multichannel computing program based on the multichannel computing program operational action event and a second multichannel computing program transmission control for the second multichannel computing program based on the multichannel computing program operational action event. In some embodiments, the at least one memory and the program code are configured to, with the at least one processor, cause the apparatus to generate the first multichannel computing program transmission package for the first multichannel computing program based on the first multichannel computing program transmission setting and the first multichannel computing program transmission control and the second multichannel computing program transmission package for the second multichannel computing program based on the second multichannel computing program transmission setting and the second multichannel computing program transmission control. In some embodiments, the at least one memory and the program code are configured to, with the at least one processor, cause the apparatus to output the first multichannel computing program transmission package to the first multichannel computing program and the second multichannel computing program transmission package to the second multichannel computing program. In some embodiments, the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels.

In some embodiments, the first multichannel computing program transmission package may configure the first multichannel computing program to transmit the first multichannel computing program transmission object via the first multichannel computing program transmission channel based on the first multichannel computing program transmission setting and the first multichannel computing program transmission control.

In some embodiments, the multichannel computing program operational graph structure may be generated using the set of multichannel computing program operational transmissions.

In some embodiments, to receive the first multichannel computing program transmission setting or the second multichannel computing program transmission setting may comprise the program code being further configured to, with the at least one processor, cause the apparatus to generate a multichannel computing program transmission setting interface component. In some embodiments, the multichannel computing program transmission setting interface component may comprise one or more multichannel computing program transmission setting command representations. In some embodiments, to receive the first multichannel computing program transmission setting or the second multichannel computing program transmission setting may comprise the program code being further configured to, with the at least one processor, cause the apparatus to output the multichannel computing program transmission setting interface component for rendering to a multichannel computing program transmission operations interface. In some embodiments, to receive the first multichannel computing program transmission setting or the second multichannel computing program transmission setting may comprise the program code being further configured to, with the at least one processor, cause the apparatus to receive the first multichannel computing program transmission setting or the second multichannel computing program transmission setting via the multichannel computing program transmission setting interface component.

In some embodiments, the plurality of multichannel computing programs may comprise at least one of an object orchestration multichannel computing program, a technology operations multichannel computing program, or a software development multichannel computing program.

In some embodiments, to generate the first multichannel computing program transmission control or the second multichannel computing program transmission control may comprise the program code being further configured to, with the at least one processor, cause the apparatus to generate, using the multichannel computing program operational graph structure, a set of multichannel computing program transmission control factors. In some embodiments, to generate the first multichannel computing program transmission control or the second multichannel computing program transmission control may comprise the program code being further configured to, with the at least one processor, cause the apparatus to generate the first multichannel computing program transmission control or the second multichannel computing program transmission control based on at least one of the set of multichannel computing program transmission control factors.

In some embodiments, the set of multichannel computing program transmission control factors may comprise a multichannel computing program transmission priority control factor. In some embodiments, to generate the multichannel computing program transmission priority control factor may comprise the program code being further configured to, with the at least one processor, cause the apparatus to apply a multichannel computing program entity operational item of the multichannel computing program operational graph structure to a transmission priority control model.

In some embodiments, the set of multichannel computing program transmission control factors may comprise a multichannel computing program transmission temporal control factor. In some embodiments, to generate the multichannel computing program transmission temporal control factor may comprise the program code being further configured to, with the at least one processor, cause the apparatus to apply at least one of a multichannel computing program entity operational item of the multichannel computing program operational graph structure or the multichannel computing program operational action event to a transmission temporal control model.

In some embodiments, the set of multichannel computing program transmission control factors may comprise a multichannel computing program transmission performance control factor. In some embodiments, to generate the multichannel computing program transmission performance control factor may comprise the program code being further configured to, with the at least one processor, cause the apparatus to apply the multichannel computing program transmission temporal control factor to a transmission performance control model.

In some embodiments, the set of multichannel computing program transmission control factors may comprise a multichannel computing program transmission sentiment control factor. In some embodiments, to generate the multichannel computing program transmission sentiment control factor may comprise the program code being further configured to, with the at least one processor, cause the apparatus to apply at least one of a multichannel computing program entity operational item of the multichannel computing program operational graph structure or the multichannel computing program operational action event to a transmission sentiment control model.

In some embodiments, the first multichannel computing program transmission control may be generated using a composite multichannel computing program transmission package configuration model.

In some embodiments, the first multichannel computing program transmission package may be outputted using a multichannel computing program transmission package execution model.

In accordance with another aspect of the present disclosure, an example method for outputting a first multichannel computing program transmission package and a second multichannel computing program transmission package is provided. In some embodiments, the method includes receiving a first multichannel computing program transmission setting for a first multichannel computing program of a plurality of multichannel computing programs and a second multichannel computing program transmission setting for a second multichannel computing program of the plurality of multichannel computing programs. In some embodiments, the method includes receiving a set of multichannel computing program operational transmissions. In some embodiments, a first multichannel computing program operational transmission of the set of multichannel computing program operational transmissions is received from the first multichannel computing program and a second multichannel computing program operational transmission of the set of multichannel computing program operational transmissions is received from the second multichannel computing program. In some embodiments, the method includes identifying a multichannel computing program operational action event associated with at least one of the plurality of multichannel computing programs. In some embodiments, the method includes generating, using a multichannel computing program operational graph structure, a first multichannel computing program transmission control for the first multichannel computing program based on the multichannel computing program operational action event and a second multichannel computing program transmission control for the second multichannel computing program based on the multichannel computing program operational action event. In some embodiments, the method includes generating the first multichannel computing program transmission package for the first multichannel computing program based on the first multichannel computing program transmission setting and the first multichannel computing program transmission control and the second multichannel computing program transmission package for the second multichannel computing program based on the second multichannel computing program transmission setting and the second multichannel computing program transmission control. In some embodiments, the method includes outputting the first multichannel computing program transmission package to the first multichannel computing program and the second multichannel computing program transmission package to the second multichannel computing program. In some embodiments, the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels. In some embodiments, the first multichannel computing program transmission package is outputted using a multichannel computing program transmission package execution model.

In some embodiments, the first multichannel computing program transmission package may configure the first multichannel computing program to transmit the first multichannel computing program transmission object via the first multichannel computing program transmission channel based on the first multichannel computing program transmission setting and the first multichannel computing program transmission control.

In some embodiments, the multichannel computing program operational graph structure may be generated using the set of multichannel computing program operational transmissions.

In some embodiments, to receive the first multichannel computing program transmission setting or the second multichannel computing program transmission setting may comprise generating a multichannel computing program transmission setting interface component. In some embodiments, the multichannel computing program transmission setting interface component may comprise one or more multichannel computing program transmission setting command representations. In some embodiments, to receive the first multichannel computing program transmission setting or the second multichannel computing program transmission setting may comprise outputting the multichannel computing program transmission setting interface component for rendering to a multichannel computing program transmission operations interface. In some embodiments, to receive the first multichannel computing program transmission setting or the second multichannel computing program transmission setting may comprise receiving the first multichannel computing program transmission setting or the second multichannel computing program transmission setting via the multichannel computing program transmission setting interface component.

In some embodiments, the plurality of multichannel computing programs may comprise at least one of an object orchestration multichannel computing program, a technology operations multichannel computing program, or a software development multichannel computing program.

In some embodiments, to generate the first multichannel computing program transmission control or the second multichannel computing program transmission control may comprise generating, using the multichannel computing program operational graph structure, a set of multichannel computing program transmission control factors. In some embodiments, to generate the first multichannel computing program transmission control or the second multichannel computing program transmission control may comprise generating the first multichannel computing program transmission control or the second multichannel computing program transmission control based on at least one of the set of multichannel computing program transmission control factors.

In some embodiments, the set of multichannel computing program transmission control factors may comprise a multichannel computing program transmission priority control factor. In some embodiments, to generate the multichannel computing program transmission priority control factor may comprise applying a multichannel computing program entity operational item of the multichannel computing program operational graph structure to a transmission priority control model.

In accordance with another exemplary embodiment of the present disclosure, a computer program product for outputting a first multichannel computing program transmission package and a second multichannel computing program transmission package is provided. In some embodiments, the computer program product includes at least one non-transitory computer-readable storage medium having computer-readable program code portions stored therein, the computer-readable program code portions comprising an executable portion. In some embodiments, the computer-readable program code portions comprising an executable portion are configured to receive a first multichannel computing program transmission setting for a first multichannel computing program of a plurality of multichannel computing programs and a second multichannel computing program transmission setting for a second multichannel computing program of the plurality of multichannel computing programs. In some embodiments, the computer-readable program code portions comprising an executable portion are configured to receive a set of multichannel computing program operational transmissions. In some embodiments, a first multichannel computing program operational transmission of the set of multichannel computing program operational transmissions is received from the first multichannel computing program and a second multichannel computing program operational transmission of the set of multichannel computing program operational transmissions is received from the second multichannel computing program. In some embodiments, the computer-readable program code portions comprising an executable portion are configured to identify a multichannel computing program operational action event associated with at least one of the plurality of multichannel computing programs. In some embodiments, the computer-readable program code portions comprising an executable portion are configured to generate, using a multichannel computing program operational graph structure and a composite multichannel computing program transmission package configuration model, a first multichannel computing program transmission control for the first multichannel computing program based on the multichannel computing program operational action event and a second multichannel computing program transmission control for the second multichannel computing program based on the multichannel computing program operational action event. In some embodiments, the computer-readable program code portions comprising an executable portion are configured to generate the first multichannel computing program transmission package for the first multichannel computing program based on the first multichannel computing program transmission setting and the first multichannel computing program transmission control and the second multichannel computing program transmission package for the second multichannel computing program based on the second multichannel computing program transmission setting and the second multichannel computing program transmission control. In some embodiments, the computer-readable program code portions comprising an executable portion are configured to output the first multichannel computing program transmission package to the first multichannel computing program and the second multichannel computing program transmission package to the second multichannel computing program. In some embodiments, the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below.

BRIEF DESCRIPTION OF THE DRAWINGS

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the figures in accordance with an example embodiment of the present disclosure.

Figure 1:
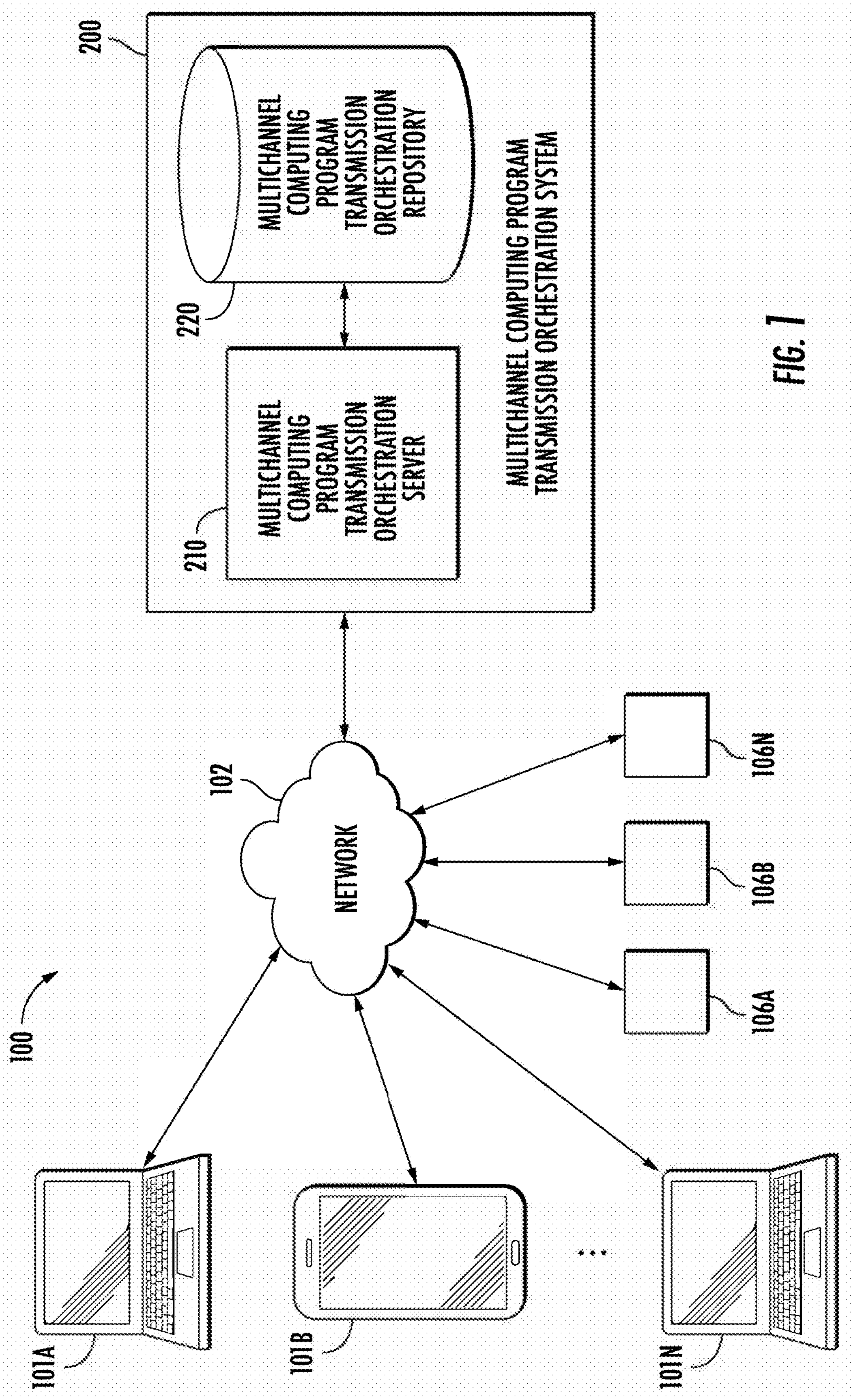
Figure 2:
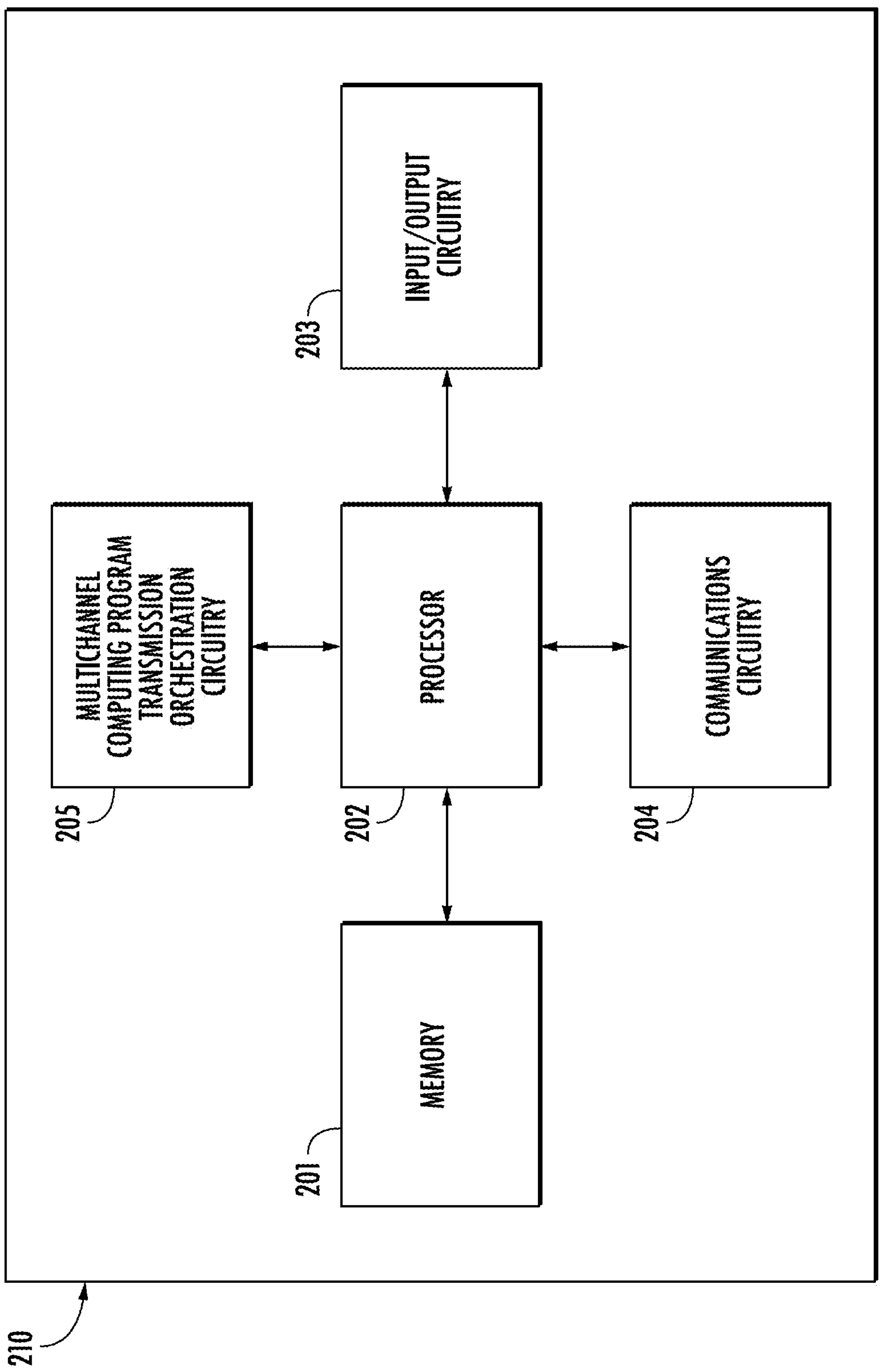
Figure 3:
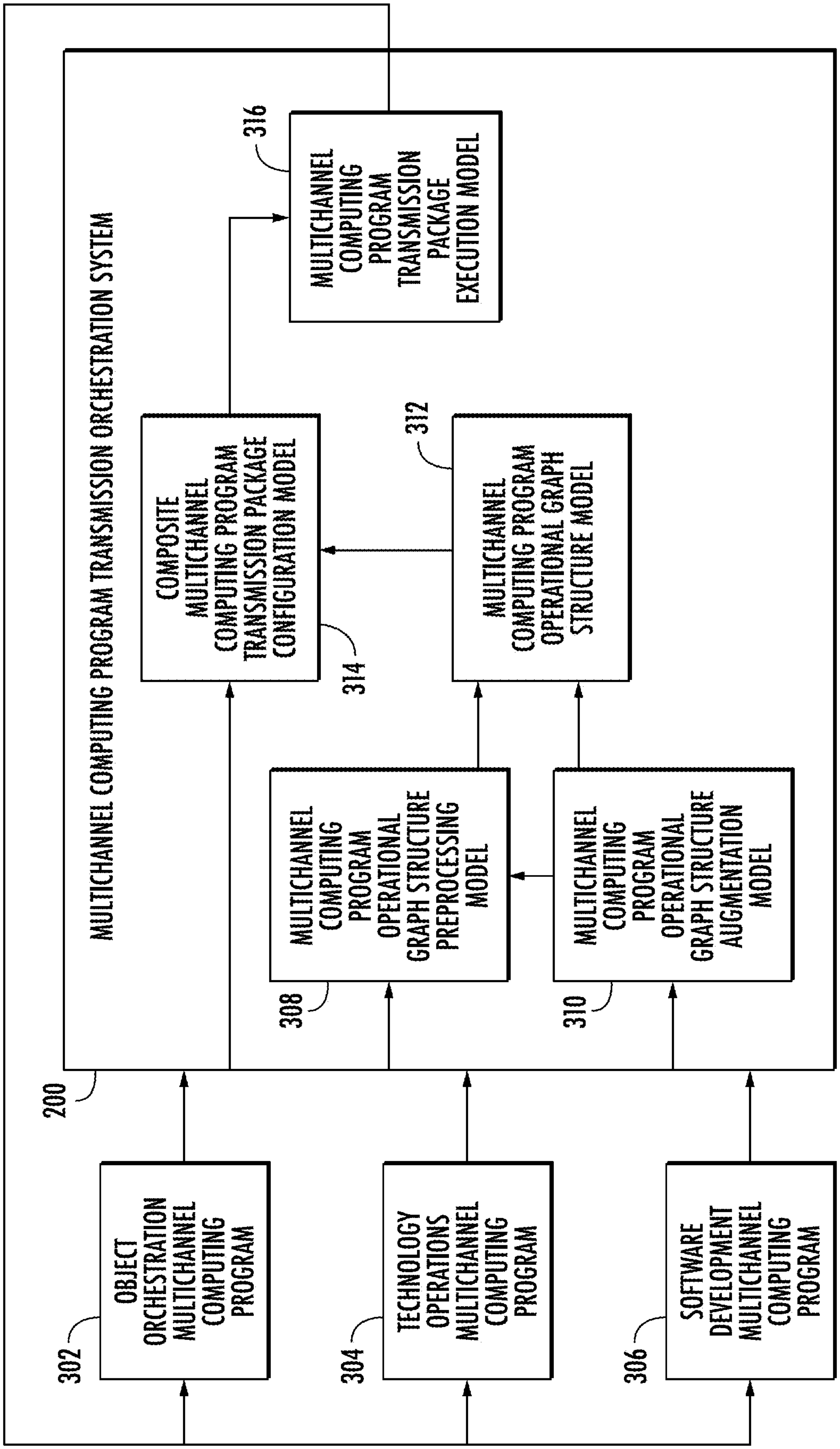
Figure 4:
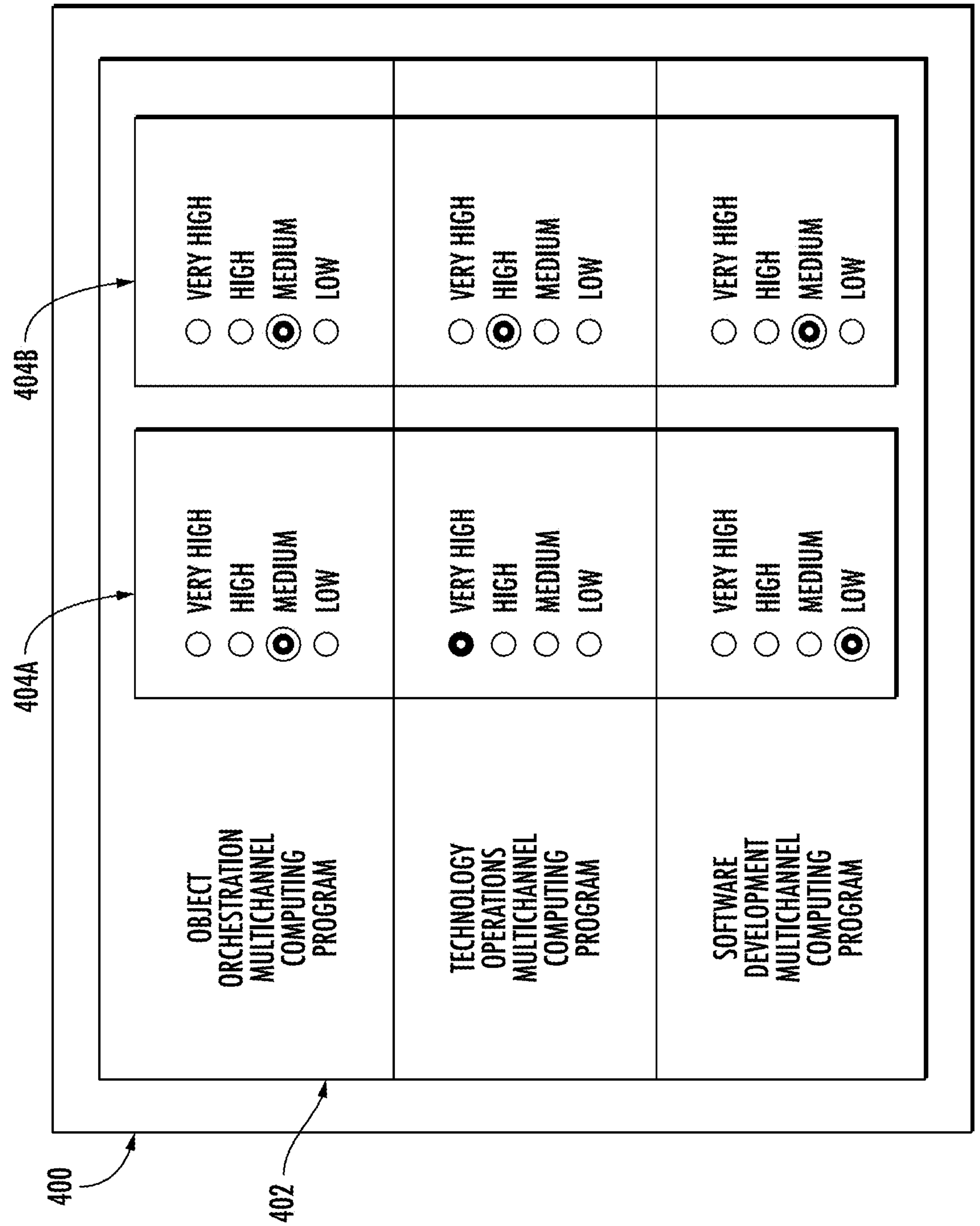
Figure 5:
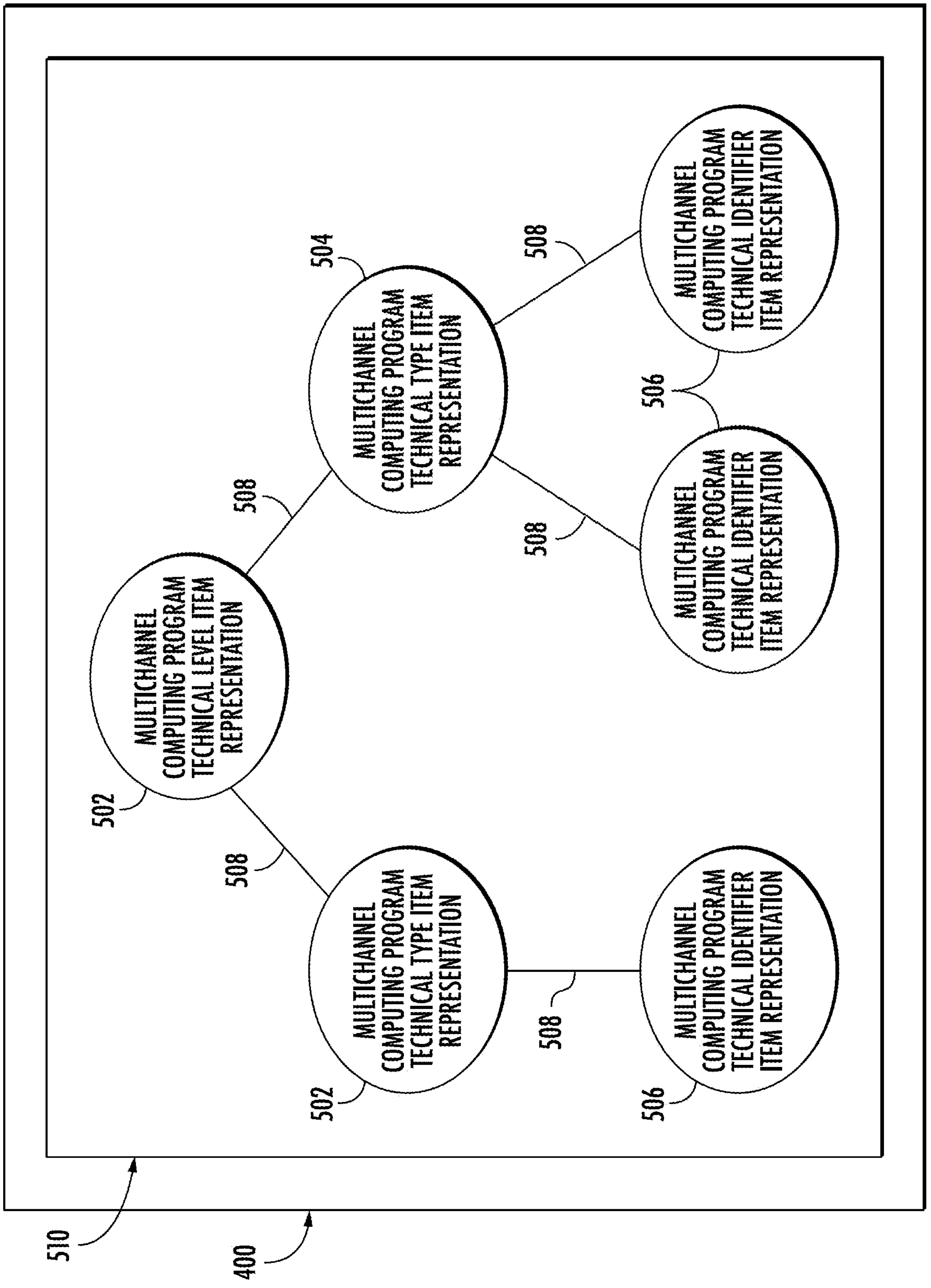
Figure 6:
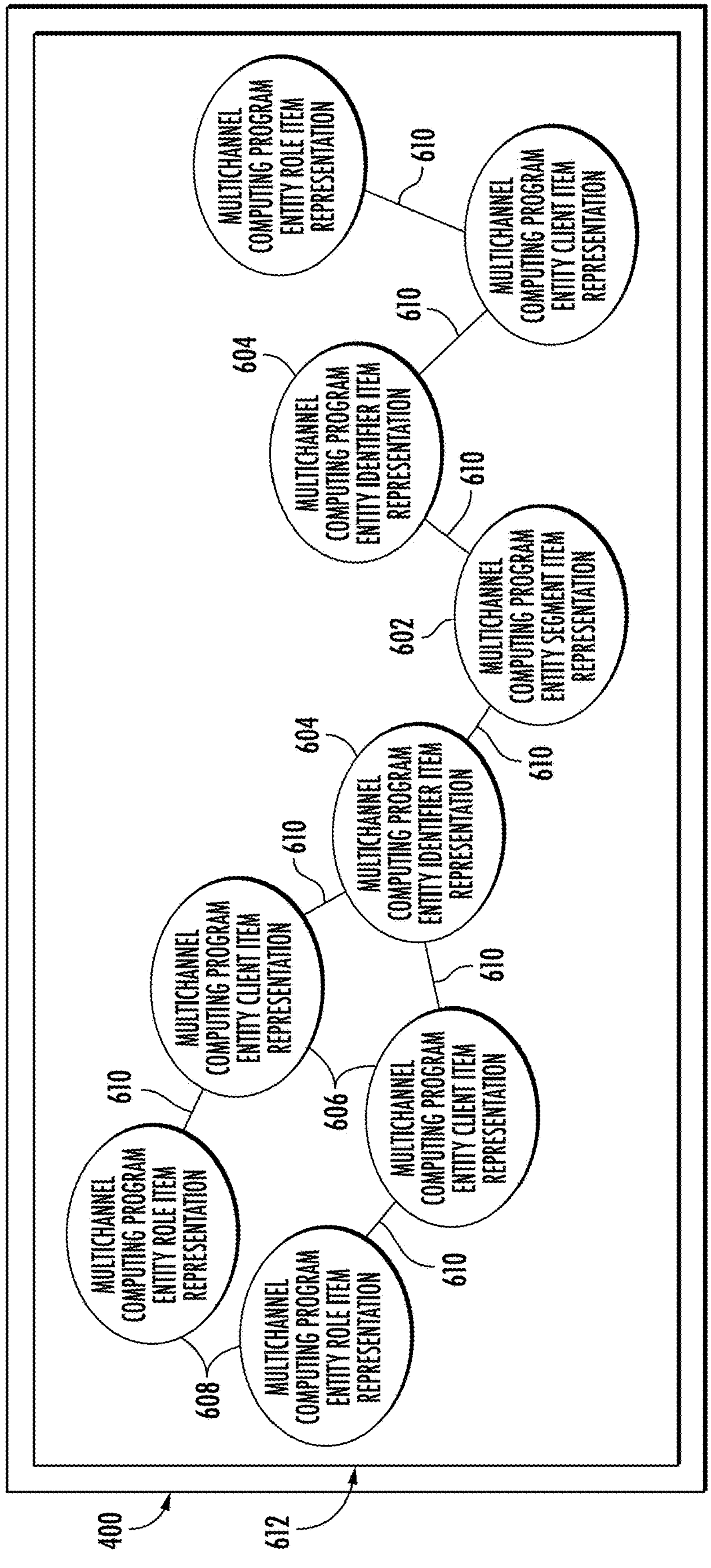
Figure 7:
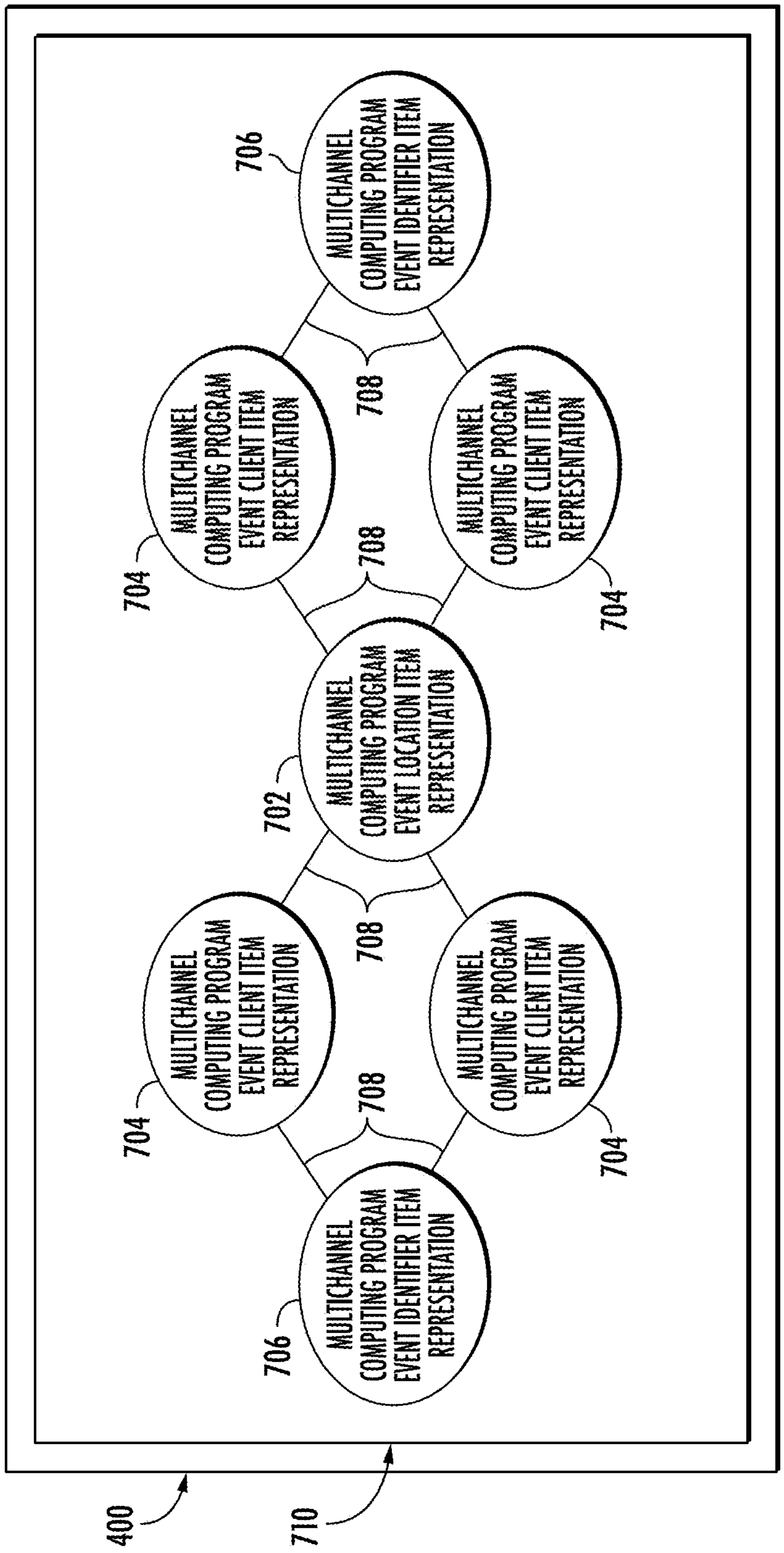
Figure 8:
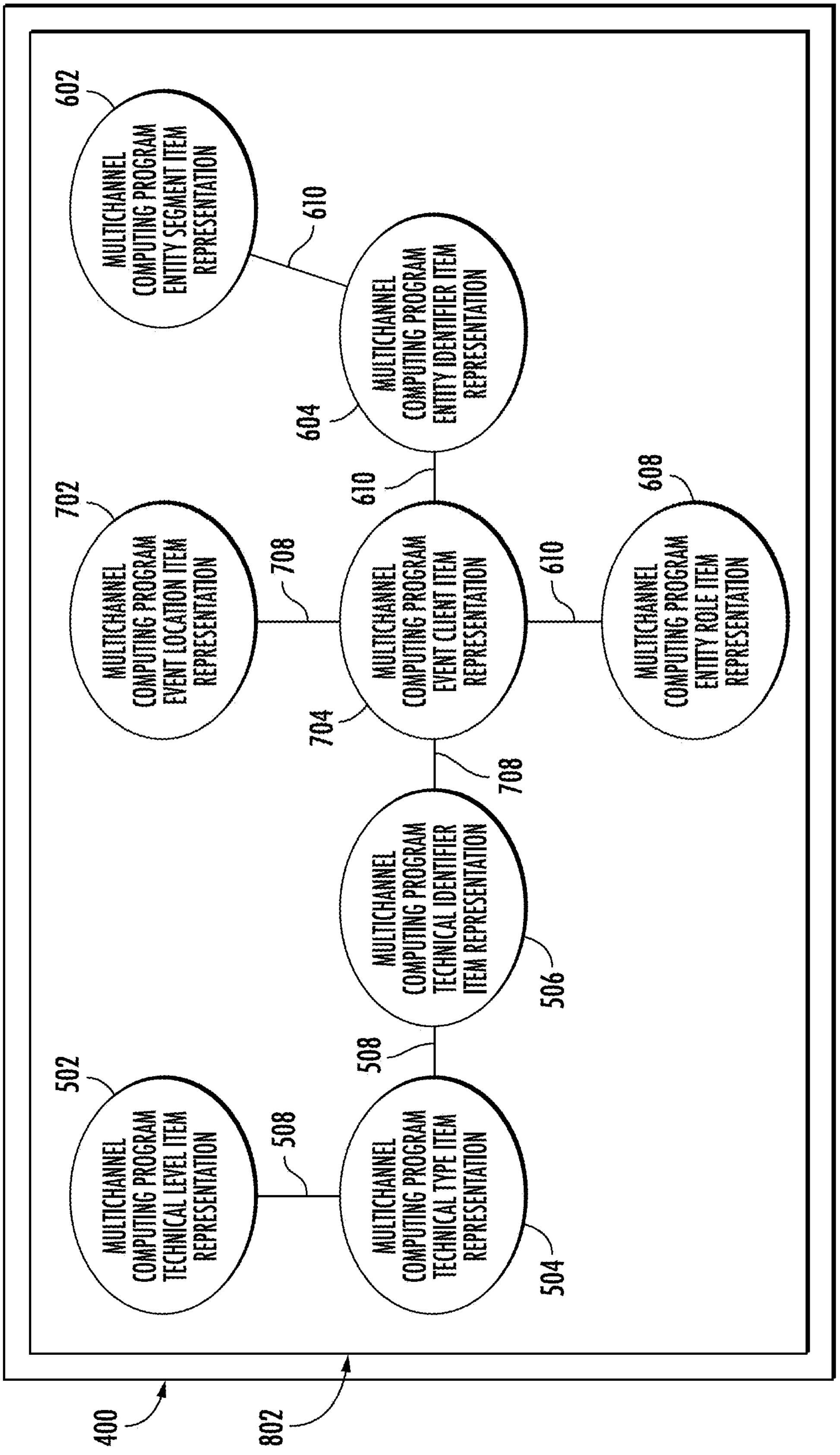
Figure 9:
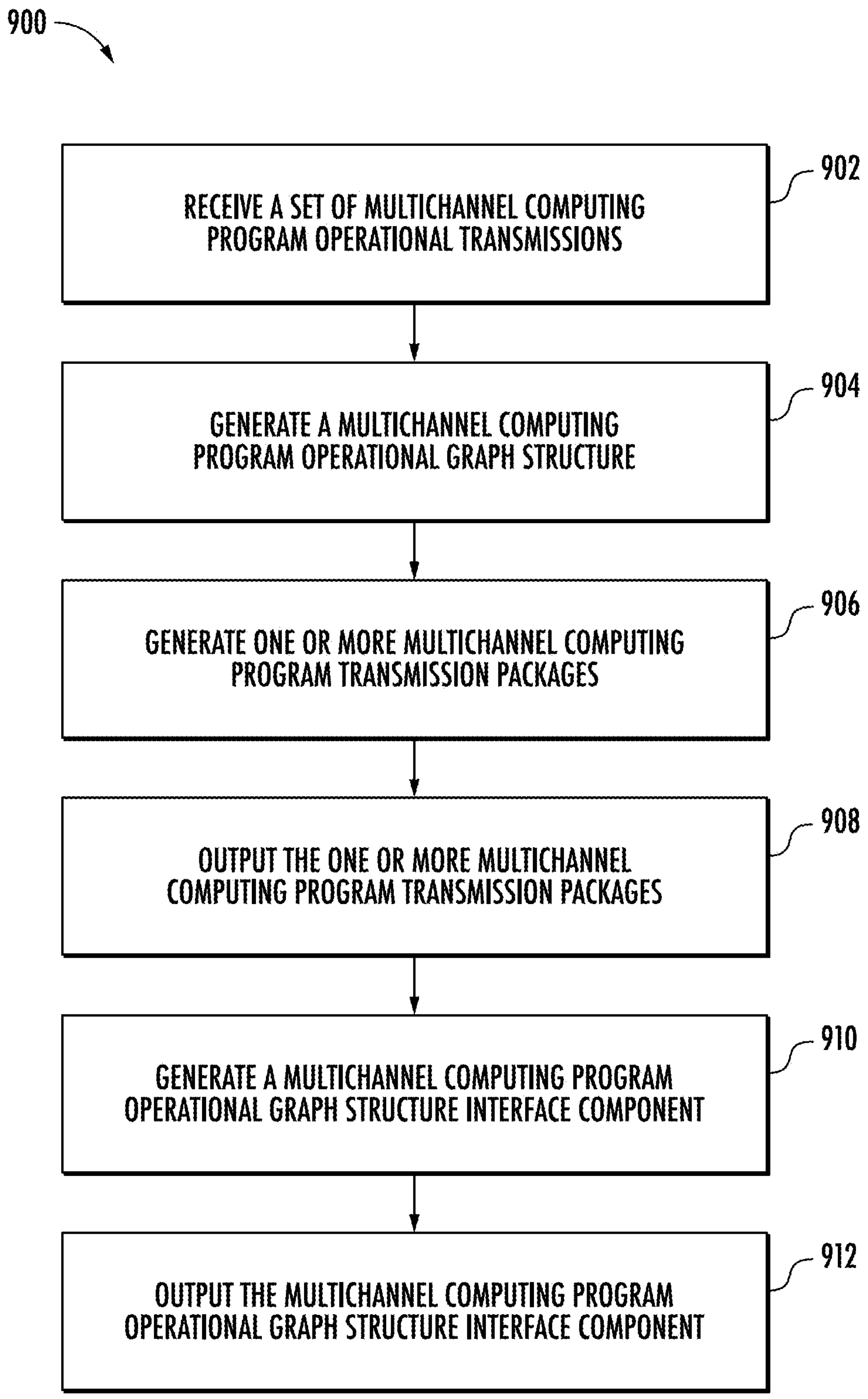
Figure 10:
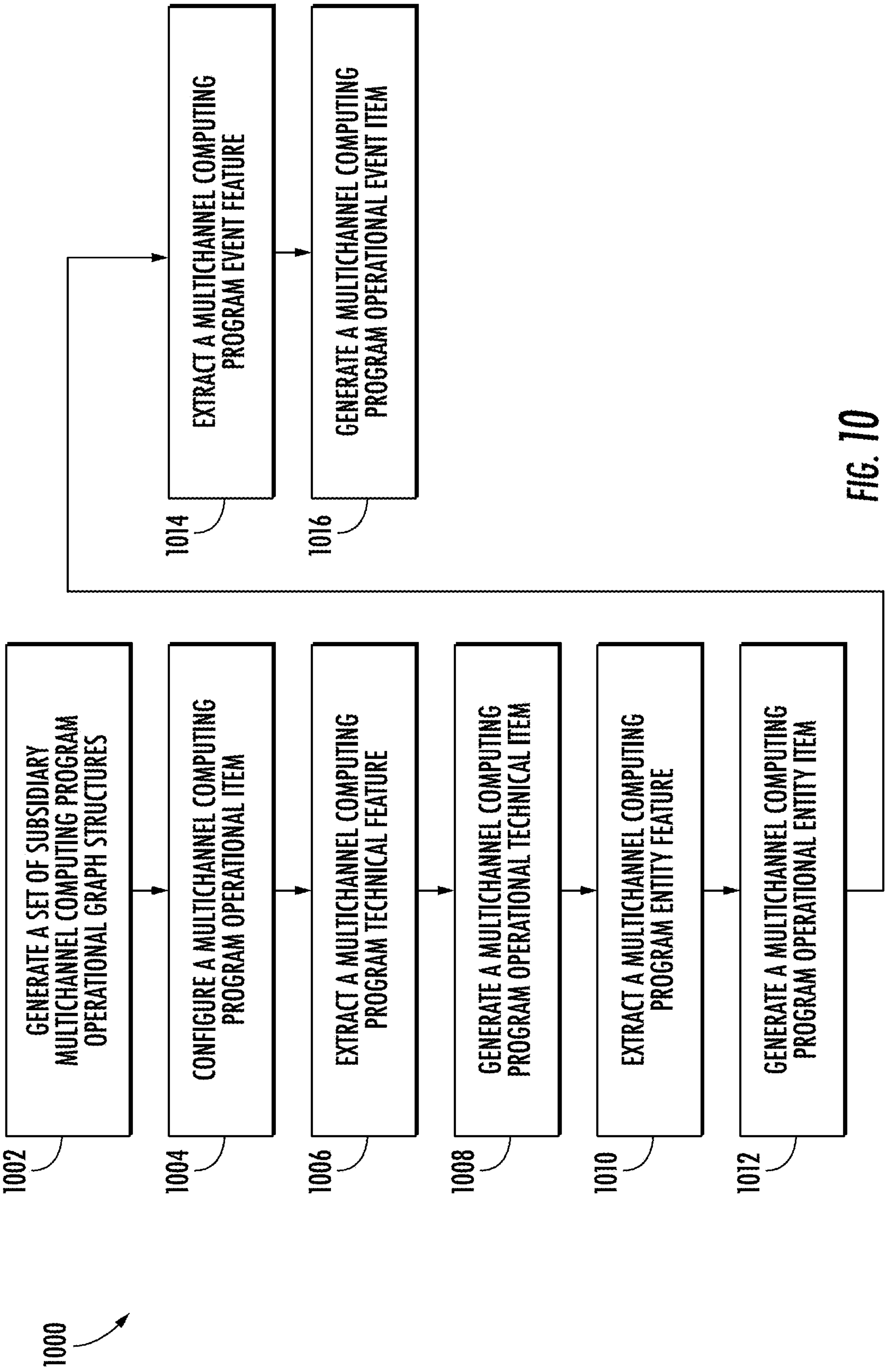
Figure 11:
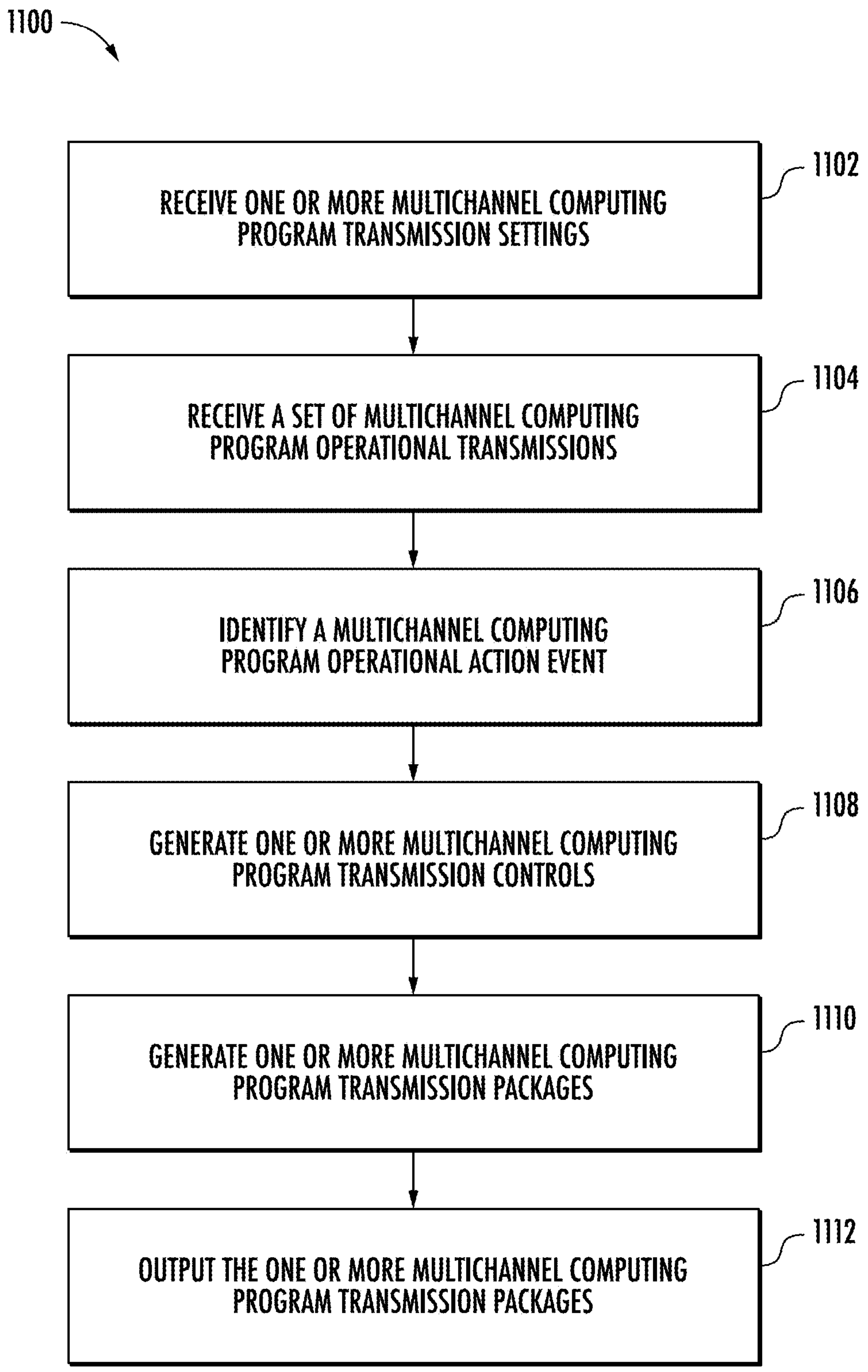
Figure 12:
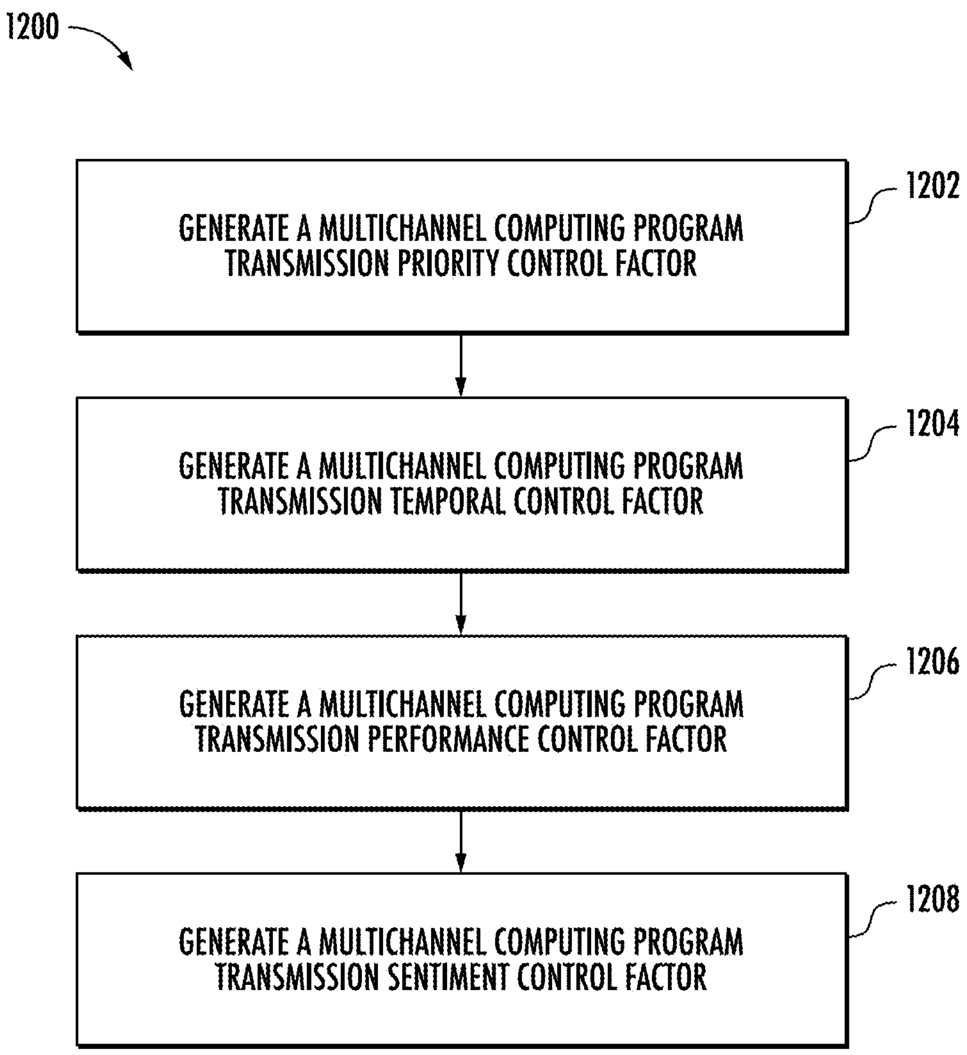

FIG. 1 illustrates an example multichannel computing program transmission orchestration system configured to communicate with various client devices in accordance with various example embodiments of the present disclosure;

FIG. 2 depicts a schematic block diagram of example circuitry to perform various operations in accordance with various example embodiments of the present disclosure;

FIG. 3 illustrates an architecture of an example multichannel computing program transmission orchestration system in accordance with various example embodiments of the present disclosure;

FIG. 4 illustrates a multichannel computing program transmission operations interface in accordance with various example embodiments of the present disclosure;

FIG. 5 illustrates a multichannel computing program transmission operations interface in accordance with various example embodiments of the present disclosure;

FIG. 6 illustrates a multichannel computing program transmission operations interface in accordance with various example embodiments of the present disclosure;

FIG. 7 illustrates a multichannel computing program transmission operations interface in accordance with various example embodiments of the present disclosure;

FIG. 8 illustrates a multichannel computing program transmission operations interface in accordance with various example embodiments of the present disclosure;

FIG. 9 depicts a flowchart diagram illustrating an example method in accordance with an example embodiment of the present disclosure;

FIG. 10 depicts a flowchart diagram illustrating an example method in accordance with an example embodiment of the present disclosure;

FIG. 11 depicts a flowchart diagram illustrating an example method in accordance with an example embodiment of the present disclosure; and FIG. 12 depicts a flowchart diagram illustrating an example method in accordance with an example embodiment of the present disclosure.

DETAILED DESCRIPTION

Example embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details. It should be understood that some, but not all embodiments of the present disclosure are shown and described herein. Indeed, embodiments of the disclosure may be embodied in many different forms, and accordingly this disclosure should not be construed as limited to the embodiments set forth herein; rather, these embodiments are provided so that this disclosure will satisfy applicable legal requirements.

Overview

Methods, apparatuses, systems, and computer program products are provided in accordance with example embodiments of the present disclosure in order to enable efficient, reliable, dynamic, and secure implementation of multichannel computing program transmission packages and provisioning of various interface components, such as multichannel computing program transmission setting interface components, multichannel computing program technical operational graph structure interface components, multichannel computing program entity operational graph structure interface components, multichannel computing program event operational graph structure interface components, multichannel computing program operational graph structure interface components, and/or the like.

Software development systems enable enterprises to plan, track, organize, schedule, address, repair, diagnose, execute, modify, transmit, and/or otherwise manage enterprise operations across multiple computing programs and communication channels. For example, such systems may enable an enterprise to implement operations using various subsystems, such as workflow management systems, information systems, and/or code development programs. In a multichannel computing environment, it is desirable for transmission orchestration systems to implement transmission packages that configure multiple programs to transmit objects via appropriate channels based on operational data, user preferences, and system events. However, many existing systems lack the capability to efficiently generate and manage such coordinated transmission packages across diverse programs and channels. As a result, it is not possible for these systems to dynamically and reliably enable enterprise operations in a complex multichannel computing environment.

In some examples, existing systems are not able to dynamically and efficiently enable multichannel operations because they cannot generate a comprehensive operational graph structure representing the relationships between different programs, entities, events, and technical components. To address this challenge, the inventors have determined it is desirable to provide a set of specialized interface components for generating subsidiary graph structures, including technical, entity, and event operational graph structures. These can then be combined and augmented to create a unified multichannel computing program operational graph structure that enables sophisticated transmission control and package generation.

In some examples, existing systems lack the ability to dynamically adjust transmission settings and controls based on real-time operational data and events. To address this, the inventors have determined it is desirable to implement a composite multichannel computing program transmission package configuration model. This model incorporates specialized sub-models for priority control, temporal control, performance control, and sentiment analysis to generate optimized transmission controls. The resulting transmission packages can then configure multiple programs to transmit objects via appropriate channels based on a holistic view of the operational environment.

In some examples, existing systems are not able to efficiently execute and monitor the transmission of objects across multiple channels and programs. To address this, the inventors have determined it is desirable to provide a multichannel computing program transmission package execution model. This model enables the dynamic output of transmission packages to the appropriate multichannel computing programs, configuring them to transmit objects via optimal channels. Additionally, the system provides interface components for visualizing and interacting with the operational graph structure, enabling users to monitor and refine the transmission orchestration process.

The embodiments of the present disclosure address these technical challenges by providing an integrated system for generating operational graph structures, configuring transmission packages, and executing coordinated communications across multiple computing programs and channels. This enables enterprises to efficiently and dynamically manage complex multichannel operations in a way that was not previously possible with existing software development and communication systems.

Definitions

The following explanations of terms are provided to better describe the present disclosure and to guide those of ordinary skill in the art in the practice of the present disclosure.

In some embodiments, the term "multichannel computing program transmission orchestration system" refers to a software platform(s) and associated hardware configured to support and maintain a plurality of projects, workflows, and all associated functionalities. For example, a multichannel computing program transmission orchestration system may comprise a software product such as Jira® by Atlassian®. Example multichannel computing program transmission orchestration systems comprise supporting server(s) and repositor(ies), and in some embodiments, are further configured to engage with internal resources, external resources, internal applications, and/or external applications.

In some embodiments, the term "multichannel computing program transmission orchestration server" refers to a software platform and associated hardware that is configured to, inter alia, manage the various interfaces and/or interface components and associated functionality of the multichannel computing program transmission orchestration system. For example, in some embodiments, the multichannel computing program transmission orchestration server is configured to generate, manage, output, and/or update multichannel computing program transmission setting interface components, multichannel computing program operational graph structure interface components, and/or the like.

In some embodiments, the term "multichannel computing program transmission orchestration application" refers to a dedicated software program, application, platform, service, web browser, and/or computer-executable application software programmed and/or configured to run on a client device which provides a user access to the multichannel computing program transmission orchestration system and its associated functionality. In some embodiments, the multichannel computing program transmission orchestration application may include hardware, software, and/or combinations thereof operating remotely (e.g., on a server). In some embodiments, the multichannel computing program transmission orchestration application is designed to execute on mobile devices, such as tablets and/or smartphones. For example, in certain embodiments, an application is provided that executes on mobile device operating systems such as iOS®, Android®, and/or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

In some embodiments, the term "multichannel computing program transmission orchestration repository" refers to a location, such as a database stored on a memory device, which is accessible by one or more computing devices for retrieval and storage of data associated with the multichannel computing program transmission orchestration system. The multichannel computing program transmission orchestration repository may be a dedicated device and/or part of a larger repository. The multichannel computing program transmission orchestration repository may be dynamically updated and/or be static. In some embodiments, the multichannel computing program transmission orchestration repository is encrypted in order to limit unauthorized access of data associated with the multichannel computing program transmission orchestration system.

In some embodiments, the term "multichannel computing program" refers to an executable code base that performs a particular set of computing functions. A multichannel computing program is able to communicate through multiple different multichannel computing program transmission channels. A multichannel computing program is accessible by a variety of different users, including software developers, information technology users, and/or the like. A multichannel computing program transmission orchestration system may be in communication with a plurality of multichannel computing programs. There are three types of multichannel computing programs, including an object orchestration multichannel computing program, a technology operations multichannel computing program, and a software development multichannel computing program.

A multichannel computing program may be developed using various programming languages and frameworks, depending on its specific requirements and target platforms. It may be designed using a modular architecture, allowing for easier maintenance and scalability. The program may implement APIs and/or use messaging protocols like MQTT and/or AMQP to enable communication through multiple channels.

In some embodiments, the term "object orchestration multichannel computing program" refers to an executable code base that performs a set of computing functions that are configured to enable enterprise operations (e.g., a work management tool for an entity). Examples of an object orchestration multichannel computing program comprise Jira Work Management, Confluence, Loom, and/or Trello.

An object orchestration multichannel computing program may be implemented as a web application, desktop application, and/or mobile app, depending on the specific use case and target users. It may use frameworks like React, Angular, and/or Vue.js for the frontend, coupled with a backend built using languages like Java, Python, and/or Node.js.

An object orchestration multichannel computing program may provide features such as task creation and assignment, project timeline management, team collaboration tools, and reporting capabilities. It may implement workflow automation using rules engines and/or scripting languages. An object orchestration multichannel computing program may also offer integrations with other enterprise tools and services through APIs, allowing for seamless data flow and process synchronization across different systems used within an entity.

In some embodiments, the term "technology operations multichannel computing program" refers to an executable code base that performs a set of computing functions that are configured to enable information technology operations. Examples of a technology operations multichannel computing program comprise Jira Service Management. For example, a technology operations multichannel program may be configured to detect and manage alerts associated with one or more other multichannel computing programs.

A technology operations multichannel computing program may be built using a microservices architecture, allowing for better scalability and easier updates of individual components. It may use containerization technologies like Docker and orchestration platforms like Kubernetes for deployment and management. The program may implement event-driven architectures using message queues (e.g., RabbitMQ, Apache Kafka) to handle real-time alerts and notifications.

In some embodiments, the term "software development multichannel computing program" refers to an executable code base that performs a set of computing functions that are configured to enable development of one or more software applications. Examples of a software development multichannel computing program comprise Jira Software (JSW), Bitbucket, and/or OpsGenie.

A software development multichannel computing program may provide features such as code repositories, issue tracking, code review tools, and project management capabilities. It may implement collaboration features like real-time editing and commenting on code. It may also offer integrations with other development tools and services, such as cloud platforms, database management systems, and API testing tools. Additionally, it may include analytics and reporting features to help development teams track their progress and identify areas for improvement in their development processes.

In some embodiments, the term "multichannel computing program transmission setting" refers to one or more settings, configurations, parameters, and/or the like that are used to generate one or more multichannel computing program transmission packages and are defined by an operator of the multichannel computing program transmission orchestration system. In some embodiments, a multichannel computing program transmission setting corresponds to a multichannel computing program. For example, a first multichannel computing program transmission setting may be for a first multichannel computing program and a second multichannel computing program transmission setting may be for a second multichannel computing program.

A multichannel computing program transmission setting may include parameters such as transmission frequency, priority levels, preferred communication channels, and message templates. They may also specify rules for message routing, retry logic for failed transmissions, and data formatting requirements.

In some embodiments, the term "multichannel computing program transmission operations interface" refers to a graphical user interface of a multichannel computing program transmission orchestration system that is configured to enable one or more users to view and engage with one or more multichannel computing program transmission orchestration workspaces, views, and/or interface components. In some embodiments, for example, a multichannel computing program transmission operations interface is configured to enable one or more users to view and engage with one or more multichannel computing program transmission setting interface components, multichannel computing program operational graph structure interface components, multichannel computing program technical operational graph structure interface components, multichannel computing program entity operational graph structure interface components, multichannel computing program event operational graph structure interface components, and/or the like. In some embodiments, a multichannel computing program transmission operations interface may be rendered to a client device based on data provided by and/or to a multichannel computing program transmission orchestration system. In some embodiments, such data and instructions are facilitated by a dedicated software application running on the client device. In other embodiments, such data and instructions are provided through a web browser running on the client device.

In some embodiments, the term "multichannel computing program transmission setting interface component" refers to an interface component that may be output for rendering to a multichannel computing program transmission operations interface. A multichannel computing program transmission setting interface component comprises one or more multichannel computing program transmission setting command representations.

A multichannel computing program transmission setting interface component may comprise form elements for inputting and editing transmission settings, such as dropdown menus, text fields, and toggle switches. It may implement client-side validation to provide immediate feedback on user inputs. It may also include visual representations of the current settings, such as charts and/or graphs that illustrate transmission patterns based on the configured settings.

In some embodiments, the term "multichannel computing program transmission setting command" refers to one or more items of data indicative and/or representative of a command received by a multichannel computing program transmission orchestration system to set, and/or implement a multichannel computing program transmission setting.

A multichannel computing program transmission setting command may be implemented as a structured data object, such as a JSON and/or XML payload. This object may contain fields specifying the type of setting to be changed, the new value for the setting, and any additional parameters and/or constraints. It may be generated by user interactions with the multichannel computing program transmission setting interface component.

In some embodiments, the term "multichannel computing program transmission setting command representation" refers to a visual representation of a multichannel computing program transmission setting command that is configured to be displayed on a multichannel computing program transmission setting interface component.

A multichannel computing program transmission setting command representation may be implemented as a UI element that visually represents a multichannel computing program transmission setting command and its current state. This could take the form of a button, a toggle switch, a slider, and/or any other appropriate UI control. A multichannel computing program transmission setting command representation may use color coding and/or icons to indicate the current state of the setting.

In some embodiments, the term "multichannel computing program operational transmission" refers to one or more computing transmissions, data packages, and/or the like received by a multichannel computing program transmission orchestration system from a multichannel computing program that are indicative of operations and/or configurations of the multichannel computing program. In some embodiments, the multichannel computing program transmission orchestration system is configured to receive a set of multichannel computing program operational transmissions from a plurality of multichannel computing programs.

A multichannel computing program operational transmission may be implemented as a structured data message, such as a JSON object and/or a Protocol Buffer message. It may be sent over various network protocols, such as HTTP/HTTPS for RESTful communications, and/or message queuing protocols like AMQP and/or MQTT for real-time event streaming.

The content of a multichannel computing program operational transmission may include information about the program's current state, performance metrics, user activities, and/or configuration changes. When received by the multichannel computing program transmission orchestration system, these transmissions may be processed, analyzed, and stored for various purposes. This may include updating the multichannel computing program transmission orchestration system's understanding of the multichannel computing program's state, triggering alerts and/or notifications based on certain conditions, and/or feeding into analytics and reporting systems.

In some embodiments, the term "multichannel computing program technical feature" refers to one or more items of data that uniquely identifies a multichannel computing program that transmitted a multichannel computing program operational transmission to a multichannel computing program transmission orchestration system. For example, a multichannel computing program technical feature may comprise one or more items of data that uniquely identifies a multichannel computing program as at least one of Jira Work Management, Confluence, Loom, and/or Trello. In some embodiments, a multichannel computing program transmission orchestration system is configured to extract a multichannel computing program technical feature from a multichannel computing program operational transmission. A multichannel computing program technical feature may be implemented as a unique identifier and/or a set of identifiers within a multichannel computing program operational transmission. When a multichannel computing program operational transmission is received, a multichannel computing program transmission orchestration system may extract the technical feature and use it to associate the transmission with the correct multichannel computing program.

In some embodiments, the term "multichannel computing program network configuration feature" refers to one or more items of data that uniquely identifies a type of multichannel computing program from which a multichannel computing program operational transmission is received by a multichannel computing program transmission orchestration system from a multichannel computing program operational transmission repository. For example, a multichannel computing program network configuration feature may comprise one or more items of data that uniquely identify a multichannel computing program as at least one of an object orchestration multichannel computing program, a technology operations multichannel computing program, and a software development multichannel computing program. Additionally, and/or alternatively, a multichannel computing program network configuration feature comprises one or more items of data that uniquely identifies a group of multichannel computing programs to which a multichannel computing program belongs and from which a multichannel computing program operational transmission is received by a multichannel computing program transmission orchestration system from a multichannel computing program operational transmission repository. A multichannel computing program network configuration feature may be implemented as a set of attributes and/or tags within a multichannel computing program operational transmission and/or associated metadata. A multichannel computing program network configuration feature is used in the construction and maintenance of a multichannel computing program operational graph structure.

In some embodiments, the term "multichannel computing program entity feature" refers to one or more items of data that uniquely identifies an entity that uses (e.g., executes) a multichannel computing program that transmitted a multichannel computing program operational transmission to a multichannel computing program transmission orchestration system. Additionally, and/or alternatively, a multichannel computing program entity feature comprises one or more items of data that uniquely identifies a user of an entity that uses (e.g., executes) a multichannel computing program that transmitted a multichannel computing program operational transmission to a multichannel computing program transmission orchestration system. Additionally, and/or alternatively, a multichannel computing program entity feature comprises one or more items of data that uniquely identifies a role of a user within an entity that uses (e.g., executes) a multichannel computing program that transmitted a multichannel computing program operational transmission to a multichannel computing program transmission orchestration system. In some embodiments, a multichannel computing program transmission orchestration system is configured to extract a multichannel computing program entity feature from a multichannel computing program operational transmission.

In some embodiments, the term "multichannel computing program network operational feature" refers to one or more items of data that uniquely identifies an operational segment (e.g., a software development segment, an information technology service management segment) associated with a multichannel computing program from which a multichannel computing program operational transmission is received by a multichannel computing program transmission orchestration system from a multichannel computing program operational transmission repository.

In some embodiments, the term "multichannel computing program event feature" refers to one or more items of data that uniquely identifies an event associated with a multichannel computing program that transmitted a multichannel computing program operational transmission to a multichannel computing program transmission orchestration system (e.g., a user executing a multichannel computing program). Additionally, and/or alternatively, a multichannel computing program event feature comprises one or more items of data that uniquely identifies a geographic location of an event associated with a multichannel computing program that transmitted a multichannel computing program operational transmission to a multichannel computing program transmission orchestration system. In some embodiments, a multichannel computing program transmission orchestration system is configured to extract a multichannel computing program entity feature from a multichannel computing program operational transmission.

In some embodiments, the term "multichannel computing program operational item" refers to a structured data element that is representative and/or indicative of one or more characteristics, configurations, and/or properties associated with a multichannel computing program and is structured to be represented in a multichannel computing program operational graph structure. In some embodiments, multichannel computing program transmission orchestration system is configured to determine and/or generate a multichannel computing program operational item based on at least one of a multichannel computing program event feature, a multichannel computing program network configuration feature, a multichannel computing program network operational feature, a multichannel computing program entity feature, and/or a multichannel computing program technical feature. A multichannel computing program operational item may be implemented as a node and/or vertex in a graph database and/or a similar data structure. A multichannel computing program operational item may have a unique identifier and a set of properties that describe its characteristics.

In some embodiments, the term "multichannel computing program operational technical item" refers to a particular type of a multichannel computing program operational item and comprises a structured data element that is representative and/or indicative of one or more characteristics, configurations, and/or properties associated with a multichannel computing program that are determined and/or generated based on at least one of a multichannel computing program technical feature and/or a multichannel computing program network configuration feature. A multichannel computing program operational technical item is structured to be represented in a multichannel computing program operational graph structure and/or a multichannel computing program operational technical graph structure.

In some embodiments, the term "multichannel computing program operational technical identifier item" refers to a particular type of a multichannel computing program operational technical item and comprises a structured data element that is representative and/or indicative of a unique multichannel computing program. For example, a multichannel computing program operational technical identifier item is a particular type of a multichannel computing program operational technical item and comprises a structured data element that is representative and/or indicative of Jira Work Management, Confluence, Loom, and/or Trello. A multichannel computing program operational technical identifier item is structured to be represented in a multichannel computing program operational graph structure and/or a multichannel computing program operational technical graph structure.

In some embodiments, the term "multichannel computing program operational technical type item" refers to a particular type of a multichannel computing program operational technical item and comprises a structured data element that is representative and/or indicative of a particular type of a multichannel computing program. For example, a multichannel computing program operational technical type item is a particular type of a multichannel computing program operational technical item and comprises a structured data element that is representative and/or indicative of an object orchestration multichannel computing program, a technology operations multichannel computing program, and a software development multichannel computing program. A multichannel computing program operational technical type item is structured to be represented in a multichannel computing program operational graph structure and/or a multichannel computing program operational technical graph structure.

In some embodiments, the term "multichannel computing program operational technical level item" refers to a particular level of a multichannel computing program operational technical item and comprises a structured data element that is representative and/or indicative of a particular group of multichannel computing programs to which a multichannel computing program belongs. A multichannel computing program operational technical level item is structured to be represented in a multichannel computing program operational graph structure and/or a multichannel computing program operational technical graph structure.

In some embodiments, the term "multichannel computing program operational item representation" refers to a visual representation of a multichannel computing program operational item and is configured to be displayed and is configured to be displayed on one or more interface components. A multichannel computing program operational item representation may be implemented as a visual element in a user interface, such as an icon, a node in a graph visualization, and/or a row in a table. The visual properties of the multichannel computing program operational item representation (e.g., shape, color, size) may be used to encode different attributes of the multichannel computing program operational item.

In some embodiments, the term "multichannel computing program operational technical item representation" refers to a visual representation of a multichannel computing program operational technical item and is configured to be displayed on one or more interface components. A multichannel computing program operational technical item representation may be implemented as a graphical element in a user interface, such as an icon, a node in a graph visualization, and/or a data point. The visual properties of the multichannel computing program operational technical item representation (e.g., shape, color, size, position) may be used to encode different attributes of a multichannel computing program operational technical item.

In some embodiments, the term "multichannel computing program operational technical identifier item representation" refers to a visual representation of a multichannel computing program operational technical identifier item and is configured to be displayed on one or more interface components. A multichannel computing program operational technical identifier item representation may be implemented as a distinct visual element in an interface component, such as a uniquely styled icon and/or a labeled node. The representation may incorporate text and/or symbols that directly indicate the identity of a specific multichannel computing program (e.g., "Jira Work Management", "Confluence", "Loom", and/or "Trello").

In some embodiments, the term "multichannel computing program operational technical type item representation" refers to a visual representation of a multichannel computing program operational technical type item and is configured to be displayed on one or more interface components. A multichannel computing program operational technical type item representation may be implemented as a visual element that encodes information about multichannel computing program operational technical type item. This could be achieved through the use of specific icons, color coding, and/or other visual cues that correspond to different multichannel computing programs (e.g., object orchestration computing programs, technology operations computing programs, and/or software development multichannel computing programs).

In some embodiments, the term "multichannel computing program operational technical level item representation" refers to a visual representation of a multichannel computing program operational technical level item and is configured to be displayed on one or more interface components. A multichannel computing program operational technical level item representation may be implemented as a visual element that indicates the hierarchical and/or organizational level of a group of multichannel computing programs.

In some embodiments, the term "multichannel computing program operational connection" refers to a structured data element that is representative of a relationship, link, bond, and/or connection between one or more multichannel computing program operational items and/or one or more other multichannel computing program operational items. A multichannel computing program operational connection comprises a multichannel computing program operational technical connection, multichannel computing program operational entity connection, and/or a multichannel computing program operational event connection.

In some embodiments, the term "multichannel computing program operational connection representation" refers to a visual representation of a multichannel computing program operational connection and is configured to be displayed on one or more interface components.

In some embodiments, the term "multichannel computing program operational technical connection" refers to a structured data element that is representative of a relationship, link, bond, and/or connection between one or more multichannel computing program operational technical items and/or one or more other multichannel computing program operational items. For example, a multichannel computing program operational technical connection may be representative of a connection between a multichannel computing program operational technical identifier item representation and a multichannel computing program operational technical type item representation. A multichannel computing program operational technical connection may be implemented as an edge and/or relationship in a graph based data structure. Each connection may have properties that describe the nature of the relationship, such as its type, strength, and/or directionality. These properties may be stored as key-value pairs, allowing for flexible representation of different types of connections.

In some embodiments, the term "multichannel computing program operational technical connection representation" refers to a visual representation of a multichannel computing program operational technical connection and is configured to be displayed on one or more interface components. A multichannel computing program operational technical connection representation may be implemented as a visual element that depicts the relationship between two and/or more multichannel computing program operational technical items.

In some embodiments, the term "multichannel computing program operational entity item" refers to a particular type of a multichannel computing program operational item and comprises a structured data element that is representative and/or indicative of one or more characteristics, configurations, and/or properties associated with a multichannel computing program that are determined and/or generated based on at least one of a multichannel computing program entity feature and/or a multichannel computing program network operational feature. A multichannel computing program operational entity item is structured to be represented in a multichannel computing program operational graph structure and/or a multichannel computing program operational entity graph structure.

In some embodiments, the term "multichannel computing program operational entity segment item" refers to a particular type of a multichannel computing program operational entity item and comprises a structured data element that is representative and/or indicative of an operational segment (e.g., a software development segment, an information technology service management segment) associated with a multichannel computing program. A multichannel computing program operational entity segment item is structured to be represented in a multichannel computing program operational graph structure and/or a multichannel computing program operational entity graph structure.

In some embodiments, the term "multichannel computing program operational entity identifier item" refers to a particular type of a multichannel computing program operational entity item and comprises a structured data element that is representative and/or indicative of an entity that uses (e.g., executes) a multichannel computing program. A multichannel computing program operational entity identifier item is structured to be represented in a multichannel computing program operational graph structure and/or a multichannel computing program operational entity graph structure.

In some embodiments, the term "multichannel computing program operational entity client item" refers to a particular type of a multichannel computing program operational entity item and comprises a structured data element that is representative and/or indicative of a user of an entity that uses (e.g., executes) a multichannel computing program. A multichannel computing program operational entity client item is structured to be represented in a multichannel computing program operational graph structure and/or a multichannel computing program operational entity graph structure.

In some embodiments, the term "multichannel computing program operational entity role item" refers to a particular type of a multichannel computing program operational entity item and comprises a structured data element that is representative and/or indicative of a role of a user within an entity that uses (e.g., executes) a multichannel computing program. A multichannel computing program operational entity role item is structured to be represented in a multichannel computing program operational graph structure and/or a multichannel computing program operational entity graph structure.

In some embodiments, the term "multichannel computing program operational entity item representation" refers to a visual representation of a multichannel computing program operational entity item and is configured to be displayed on one or more interface components. A multichannel computing program operational entity item representation may be implemented as a graphical element in a user interface, such as an icon, a node in a graph visualization, and/or an entry in a list and/or table. The visual properties of the representation (e.g., shape, color, size, position) may be used to encode different attributes of the multichannel computing program operational entity item.

In some embodiments, the term "multichannel computing program operational entity segment item representation" refers to a visual representation of a multichannel computing program operational entity segment item and is configured to be displayed on one or more interface components. A multichannel computing program operational entity segment item representation may be implemented as a visual element that encodes information about a multichannel computing program operational entity segment item. This could be achieved through the use of specific icons, color coding, and/or other visual cues that correspond to different operational segments (e.g., software development, information technology service management).

In some embodiments, the term "multichannel computing program operational entity identifier item representation" refers to a visual representation of a multichannel computing program operational entity identifier item and is configured to be displayed on one or more interface components. A multichannel computing program operational entity identifier item representation may be implemented as a distinct visual element in an interface component, such as a uniquely styled icon and/or a labeled node.

In some embodiments, the term "multichannel computing program operational entity client item representation" refers to a visual representation of a multichannel computing program operational entity client item and is configured to be displayed on one or more interface components. A multichannel computing program operational entity client item representation may be implemented as a visual element that represents an individual user within an entity. This could be achieved through the use of user avatars, name labels, and/or other visual indicators that uniquely identify a user.

In some embodiments, the term "multichannel computing program operational entity role item representation" refers to a visual representation of a multichannel computing program operational entity role item and is configured to be displayed on one or more interface components. A multichannel computing program operational entity role item representation may be implemented as a visual element that indicates the role of a user within an entity. This could be achieved through techniques such as role-specific icons, color coding, and/or text labels that clearly denote the user's role (e.g., administrator, developer, manager).

In some embodiments, the term "multichannel computing program operational entity connection" refers to a structured data element that is representative of a relationship, link, bond, and/or connection between one or more multichannel computing program operational entity items and/or one or more other multichannel computing program operational items. For example, a multichannel computing program operational entity connection may be representative of a connection between a multichannel computing program operational entity identifier item representation and a multichannel computing program operational entity client item representation. A multichannel computing program operational entity connection may be implemented as an edge and/or relationship in a graph based data structure.

In some embodiments, the term "multichannel computing program operational entity connection representation" refers to a visual representation of a multichannel computing program operational entity connection and is configured to be displayed on one or more interface components. A multichannel computing program operational entity connection representation may be implemented as a visual element that depicts the relationship between two and/or more multichannel computing program operational entity items. This could be achieved through techniques such as lines and/or arrows connecting nodes in a graph visualization, hierarchical tree structures, and/or other visual metaphors that convey relationships between entities, users, roles, and programs.

In some embodiments, the term "multichannel computing program operational event item" refers to a particular type of a multichannel computing program operational item and comprises a structured data element that is representative and/or indicative of one or more characteristics, configurations, and/or properties associated with a multichannel computing program that are determined and/or generated based on a multichannel computing program event feature. A multichannel computing program operational event item is structured to be represented in a multichannel computing program operational graph structure and/or a multichannel computing program operational event graph structure.

In some embodiments, the term "multichannel computing program operational event client item" refers to a particular type of a multichannel computing program operational event item and comprises a structured data element that is representative and/or indicative of a user of a multichannel computing program when an event occurs with the multichannel computing program. A multichannel computing program operational event client item is structured to be represented in a multichannel computing program operational graph structure and/or a multichannel computing program operational event graph structure.

In some embodiments, the term "multichannel computing program operational event identifier item" refers to a particular type of a multichannel computing program operational event item and comprises a structured data element that is representative and/or indicative of a particular multichannel computing program that is associated with an event (e.g., Jira Work Management). A multichannel computing program operational event identifier item is structured to be represented in a multichannel computing program operational graph structure and/or a multichannel computing program operational event graph structure.

In some embodiments, the term "multichannel computing program operational event location item" refers to a particular type of a multichannel computing program operational event item and comprises a structured data element that is representative and/or indicative of a location of a user of a multichannel computing program when an event occurs with the multichannel computing program. A multichannel computing program operational event location item is structured to be represented in a multichannel computing program operational graph structure and/or a multichannel computing program operational event graph structure.

In some embodiments, the term "multichannel computing program operational event item representation" refers to a visual representation of a multichannel computing program operational event item and is configured to be displayed on one or more interface components. A multichannel computing program operational event item representation may be implemented as a graphical element in a user interface, such as an icon, a point on a timeline, and/or an entry in an event log. The visual properties of the representation (e.g., shape, color, size, position) may be used to encode different attributes of a multichannel computing program operational event item. For example, different icons may represent different types of events, while colors may indicate their severity and/or associated program.

In some embodiments, the term "multichannel computing program operational event client item representation" refers to a visual representation of a multichannel computing program operational event client item and is configured to be displayed on one or more interface components. A multichannel computing program operational event client item representation may be implemented as a visual element that represents a user associated with a specific event in a multichannel computing program. This could be achieved through the use of user avatars, name labels, and/or other visual indicators that uniquely identify the user in the context of the event.

In some embodiments, the term "multichannel computing program operational event identifier item representation" refers to a visual representation of a multichannel computing program operational event identifier item and is configured to be displayed on one or more interface components. A multichannel computing program operational event identifier item representation may be implemented as a distinct visual element in an interface component, such as a uniquely styled icon and/or a labeled node.

In some embodiments, the term "multichannel computing program operational event location item representation"

refers to a visual representation of a multichannel computing program operational event location item and is configured to be displayed on one or more interface components. A multichannel computing program operational event location item representation may be implemented as a visual element that indicates the geographical and/or logical location associated with an event in a multichannel computing program.

In some embodiments, the term "multichannel computing program operational event connection" refers to a structured data element that is representative of a relationship, link, bond, and/or connection between one or more multichannel computing program operational event items and/or one or more other multichannel computing program operational items. For example, a multichannel computing program operational event connection may be representative of a connection between a multichannel computing program operational event client item representation and a multichannel computing program operational event location item representation. A multichannel computing program operational event connection may be implemented as an edge and/or relationship in a graph based data structure.

In some embodiments, the term "multichannel computing program operational event connection representation" refers to a visual representation of a multichannel computing program operational event connection and is configured to be displayed on one or more interface components. A multichannel computing program operational event connection representation may be implemented as a visual element that depicts the relationship between two and/or more multichannel computing program operational event items and/or between event items and other operational items. This could be achieved through techniques such as lines and/or arrows connecting nodes in a graph visualization, flow diagrams showing event sequences, and/or other visual metaphors that convey relationships between events, users, locations, and programs.

In some embodiments, the term "multichannel computing program technical operational graph structure" refers to a graph-based data structure the comprises one or more multichannel computing program operational technical items and one or more multichannel computing program operational technical connections that define links, relationships, bonds, and/or connections between one or more of the one or more multichannel computing program operational technical items in the graph-based structure. In some embodiments, a multichannel computing program technical operational graph structure is one of a set of subsidiary multichannel computing program operational graph structures. A multichannel computing program transmission orchestration system may continuously update and maintain this graph structure as it processes multichannel computing program operational transmissions.

In some embodiments, the term "multichannel computing program technical operational graph structure representation" refers to a visual representation of a multichannel computing program technical operational graph structure and is configured to be displayed on one or more interface components. A multichannel computing program technical operational graph structure representation may be implemented using specialized graph visualization libraries such as D3.js, Cytoscape.js, and/or Sigma.js. These libraries provide capabilities for rendering complex graph structures as interactive visualizations in web-based interfaces.

In some embodiments, the term "multichannel computing program entity operational graph structure" refers to a graph-based data structure the comprises one or more multichannel computing program operational entity items and one or more multichannel computing program operational entity connections that define links, relationships, bonds, and/or connections between one or more of the one or more multichannel computing program operational entity items in the graph-based structure. In some embodiments, a multichannel computing program entity operational graph structure is one of a set of subsidiary multichannel computing program operational graph structures. A multichannel computing program entity operational graph structure may be implemented using a graph database system such as Neo4j, TigerGraph, and/or ArangoDB. The system may dynamically update and maintain this graph structure as it processes multichannel computing program operational transmissions.

In some embodiments, the term "multichannel computing program entity operational graph structure representation" refers to a visual representation of a multichannel computing program entity operational graph structure and is configured to be displayed on one or more interface components. A multichannel computing program entity operational graph structure representation may be implemented using graph visualization libraries such as Vis.js, Graphviz, and/or Gephi. These libraries provide capabilities for rendering complex graph structures as interactive visualizations in web-based and/or desktop interfaces.

In some embodiments, the term "multichannel computing program event operational graph structure" refers to a graph-based data structure the comprises one or more multichannel computing program operational event items and one or more multichannel computing program operational event connections that define links, relationships, bonds, and/or connections between one or more of the one or more multichannel computing program operational event items in the graph-based structure. In some embodiments, a multichannel computing program event operational graph structure is one of a set of subsidiary multichannel computing program operational graph structures.

In some embodiments, the term "multichannel computing program event operational graph structure representation" refers to a visual representation of a multichannel computing program event operational graph structure and is configured to be displayed on one or more interface components.

In some embodiments, the term "multichannel computing program technical operational graph structure interface component" refers to an interface component that may be output for rendering to a multichannel computing program transmission operations interface. A multichannel computing program technical operational graph structure interface component comprises one or more multichannel computing program technical operational graph structure representations, multichannel computing program operational technical item representations, and/or multichannel computing program operational technical connection representations.

In some embodiments, the term "multichannel computing program entity operational graph structure interface component" refers to an interface component that may be output for rendering to a multichannel computing program transmission operations interface. A multichannel computing program entity operational graph structure interface component comprises one or more multichannel computing program entity operational graph structure representations, multichannel computing program operational entity item representations, and/or multichannel computing program operational entity connection representations. A multichannel computing program entity operational graph structure interface component may offer a variety of interactive features for exploring and analyzing a multichannel computing program entity operational graph structure. These may include hierarchical view toggles, role-based filtering, and the ability to trace relationships.

In some embodiments, the term "multichannel computing program event operational graph structure interface component" refers to an interface component that may be output for rendering to a multichannel computing program transmission operations interface. A multichannel computing program event operational graph structure interface component comprises one or more multichannel computing program event operational graph structure representations, multichannel computing program operational event item representations, and/or multichannel computing program operational event connection representations.

In some embodiments, the term "multichannel computing program operational graph structure preprocessing model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to generate one or more subsidiary multichannel computing program operational graph structures, multichannel computing program operational items, and/or multichannel computing program operational connections. In this regard, in some embodiments, a multichannel computing program operational graph structure preprocessing model may be configured to utilize one or more of any type of machine learning, rules-based, and/or artificial intelligence techniques including one or more of computer vision techniques, image processing techniques, optical character recognition techniques, supervised learning (e.g., using user feedback), unsupervised learning, semi-supervised learning, reinforcement learning, sequence modeling techniques, language processing techniques, neural network techniques, and/or generative artificial intelligence techniques. In some embodiments, a multichannel computing program operational graph structure preprocessing model is configured to be trained. A multichannel computing program operational graph structure preprocessing model may be implemented using advanced machine learning frameworks such as TensorFlow, PyTorch, and/or scikit-learn. The model architecture may comprise such as natural language processing modules for parsing textual data, convolutional neural networks for processing structured data, and graph neural networks for learning from existing graph structures.

In some embodiments, the term "multichannel computing program technical operational graph structure" refers to a graph-based data structure the comprises one or more multichannel computing program operational technical items and one or more multichannel computing program operational technical connections that define links, relationships, bonds, and/or connections between one or more of the one or more multichannel computing program operational technical items in the graph-based structure. A multichannel computing program transmission orchestration system may continuously update and maintain this graph structure as it processes new multichannel computing program transmissions.

In some embodiments, the term "multichannel computing program operations augmentation feature" refers to one or more items of data that are used to configure one or more multichannel computing program operational items. In this regard, for example, a multichannel computing program operations augmentation feature may comprise one or more items of data that may be used to add additional information to a multichannel computing program operational item. For example, a multichannel computing program operations augmentation feature may comprise one or more of a communication preferences associated with a user of a multichannel computing program, a support ticket metric associated with a user of a multichannel computing program, performance indicators for an instance of a multichannel computing program used by a particular user, and/or a user segment that a particular user of a multichannel computing program belongs to. A multichannel computing program operations augmentation feature may be implemented as a structured data object, stored in a database system such as MongoDB and/or Cassandra, which allows for flexible schema design. A multichannel computing program operations augmentation feature augmentation feature may be used by the system to enrich the multichannel computing program operational items with additional context and metadata.

In some embodiments, the term "multichannel computing program operational graph structure augmentation model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to configure a multichannel computing program operational item based on a multichannel computing program operations augmentation feature. In this regard, in some embodiments, a multichannel computing program operational graph structure augmentation model may be configured to utilize one or more of any type of machine learning, rules-based, and/or artificial intelligence techniques including one or more of computer vision techniques, image processing techniques, optical character recognition techniques, supervised learning (e.g., using user feedback), unsupervised learning, semi-supervised learning, reinforcement learning, sequence modeling techniques, language processing techniques, neural network techniques, and/or generative artificial intelligence techniques. In some embodiments, a multichannel computing program operational graph structure augmentation model is configured to be trained. A multichannel computing program operational graph structure augmentation model may be implemented using advanced machine learning frameworks such as TensorFlow, PyTorch, and/or H2O.ai.

In some embodiments, the term "multichannel computing program operational graph structure" refers to a graph-based data structure the comprises one or more multichannel computing program operational items and one or more multichannel computing program operational connections that define links, relationships, bonds, and/or connections between one or more of the one or more multichannel computing program operational items in the graph-based structure. In this regard, for example, a multichannel computing program operational graph structure comprises set of set of subsidiary multichannel computing program operational graph structures that comprises one or more of the multichannel computing program technical operational graph structure, multichannel computing program entity operational graph structure, and/or multichannel computing program event operational graph structure in which at least one multichannel computing program operational connection has been configured based on a multichannel computing program operations augmentation feature.

In some embodiments, the term "multichannel computing program operational graph structure representation" refers to a visual representation of a multichannel computing program operational graph structure and is configured to be displayed on one or more interface components.

In some embodiments, the term "multichannel computing program operational graph structure interface component" refers to an interface component that may be output for rendering to a multichannel computing program transmission operations interface. A multichannel computing program event operational graph structure interface component comprises one or more multichannel computing program operational graph structure representations and/or the like. A multichannel computing program operational graph structure interface component may be implemented as a sophisticated, modular UI component using advanced web application frameworks In some embodiments, the term "multichannel computing program operational graph structure model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to generate a multichannel computing program operational graph structure. In this regard, in some embodiments, a multichannel computing program operational graph structure model may be configured to utilize one or more of any type of machine learning, rules-based, and/or artificial intelligence techniques including one or more of computer vision techniques, image processing techniques, optical character recognition techniques, supervised learning (e.g., using user feedback), unsupervised learning, semi-supervised learning, reinforcement learning, sequence modeling techniques, language processing techniques, neural network techniques, and/or generative artificial intelligence techniques. In some embodiments, a multichannel computing program operational graph structure model is configured to be trained.

In some embodiments, the term "composite multichannel computing program transmission package configuration model" refers to a composite model with a unique architecture that comprises a transmission priority control model, a transmission temporal control model, a transmission sentiment control model, a transmission performance control model, and/or a multichannel computing program transmission control model.

A composite multichannel computing program transmission package configuration model may be implemented as a sophisticated ensemble model, integrating multiple specialized sub-models using techniques like stacking and/or boosting. It may be built using advanced machine learning frameworks such as H2O.ai's AutoML, and/or custom implementations leveraging distributed computing platforms like Apache Spark for handling large-scale data and complex computations. The model architecture may incorporate meta-learning techniques for dynamically adjusting the weights and contributions of different sub-models based on the specific context of each task. A composite multichannel computing program transmission package configuration model orchestrates the interactions between its various components to generate comprehensive and optimized multichannel computing program transmission packages.

In some embodiments, the term "multichannel computing program operational action event" refers to an event associated with a multichannel computing program and/or a multichannel computing program transmission orchestration system that triggers a multichannel computing program transmission orchestration system to generate a multichannel computing program transmission package. For example, a multichannel computing program operational action event may an update to a multichannel computing program, a technical fault associated with a multichannel computing program, information associated with a multichannel computing program, and/or the like. A multichannel computing program operational action event may be implemented as a structured data object within an event-driven architecture, using technologies such as Apache Kafka, RabbitMQ, and/or AWS EventBridge. The structured data object may contain fields such as an event type, timestamp, source program identifier, and a payload with event-specific details. The system may use a publish-subscribe model to distribute these events to relevant components of the multichannel computing program transmission orchestration system.

In some embodiments, the term "multichannel computing program transmission control" refers to one or more controls that are used for generating a computing program transmission package and are generated by a multichannel computing program transmission orchestrations system using a multichannel computing program operational graph structure. In some embodiments, a multichannel computing program transmission control corresponds to a multichannel computing program. For example, a first multichannel computing program transmission control may be for a first multichannel computing program and a second multichannel computing program transmission control may be for a second multichannel computing program. A multichannel computing program transmission control may be implemented as a set of parameters and rules stored in a configuration management database (CMDB) and/or a specialized control repository.

In some embodiments, the term "multichannel computing program transmission control factor" refers to a factor that is used for generating a multichannel computing program transmission control. A multichannel computing program transmission control factor may be implemented as a set of variables and/or parameters within a decision support system and/or a machine learning model. In some embodiments, a multichannel computing program transmission orchestration system is associated with a set of multichannel computing program transmission control factors. In this regard, for example, a set of multichannel computing program transmission control factors comprises one or more of a multichannel computing program transmission priority control factor, a multichannel computing program transmission temporal control factor, a multichannel computing program transmission performance control factor, and/or a multichannel computing program transmission sentiment control factor.

In some embodiments, the term "multichannel computing program transmission priority control factor" refers to a factor that is used for generating a multichannel computing program transmission control and is indicative of one or more communication preferences of a user associated with a multichannel computing program based on a user's usage of a multichannel computing program. In some embodiments, a multichannel computing program transmission priority control factor is a particular type of a multichannel computing program transmission control factor.

In some embodiments, the term "transmission priority control model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to generate a multichannel computing program transmission priority control factor based on a multichannel computing program entity operational item of a multichannel computing program operational graph structure. In some embodiments, a transmission priority control model is configured to implement a cosine similarity technique. In some embodiments, a transmission priority control model is a portion of a composite multichannel computing program transmission package configuration model.

In some embodiments, the term "multichannel computing program transmission temporal control factor" refers to a factor that is used for generating a multichannel computing program transmission control and is indicative of an amount of time between transmission of a previous multichannel computing program transmission object and an interaction with the previous multichannel computing program transmission object by a user of a multichannel computing program. In some embodiments, a multichannel computing program transmission temporal control factor is a particular type of a multichannel computing program transmission control factor.

In some embodiments, the term "transmission temporal control model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to generate a multichannel computing program transmission temporal control factor based on a multichannel computing program entity operational item of a multichannel computing program operational graph structure and/or a multichannel computing program operational action event. In some embodiments, a transmission temporal control model is configured to implement a MLP regressor technique. In some embodiments, a transmission priority control model is a portion of a composite multichannel computing program transmission package configuration model.

In some embodiments, the term "multichannel computing program transmission performance control factor" refers to a factor that is used for generating a multichannel computing program transmission control and is indicative of one or more performance indicators of a multichannel computing program, such as time to resolution for incidents, pull request cycle time, and/or the like. In some embodiments, a multichannel computing program transmission performance control factor is a particular type of a multichannel computing program transmission control factor.

In some embodiments, the term "transmission performance control model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to generate a multichannel computing program transmission performance control factor based on a multichannel computing program transmission control factor. In some embodiments, a transmission performance control model is configured to implement a gradient boosting regression technique. In some embodiments, a transmission priority control model is a portion of a composite multichannel computing program transmission package configuration model.

In some embodiments, the term "multichannel computing program transmission sentiment control factor" refers to a factor that is used for generating a multichannel computing program transmission control and is indicative of a sentiment of a user of a multichannel computing program. In some embodiments, a multichannel computing program transmission sentiment control factor is a particular type of a multichannel computing program transmission control factor.

In some embodiments, the term "transmission sentiment control model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to generate a multichannel computing program transmission sentiment control factor based on a multichannel computing program entity operational item of a multichannel computing program operational graph structure and/or a multichannel computing program operational action event. In some embodiments, a transmission priority control model is a portion of a composite multichannel computing program transmission package configuration model.

In some embodiments, the term "multichannel computing program transmission package" refers to a computing transmission, data package, and/or the like that is configured to configure a multichannel computing program to transmit multichannel computing program transmission objects via particular multichannel computing program transmission channels of a plurality of multichannel computing program channels. A multichannel computing program transmission package is generated based on one or more multichannel computing program transmission settings and/or one or more multichannel computing program transmission controls. A multichannel computing program transmission package may be implemented as a structured data object, potentially using formats like JSON, XML, and/or Protocol Buffers, which encapsulates all the necessary information for configuring and executing a transmission across multiple channels. These packages may be stored in a distributed message queue system like Apache Kafka and/or RabbitMQ, allowing for efficient distribution and processing across the multichannel computing program ecosystem. The system may use template engines and/or dynamic content generation systems to create the content of these packages based on the specified transmission settings and controls.

A multichannel computing program transmission package may contain various components, such as the content to be transmitted, metadata about the intended recipients and channels, scheduling information, and any channel-specific formatting and/or delivery instructions. It may also include tracking identifiers for monitoring the progress and effectiveness of the transmission across different channels. When received by a multichannel computing program, the transmission package is parsed and used to configure a multichannel computing program's communication behavior, determining what content is sent, through which channels, to which users, and at what times. This package-based approach allows for centralized control and coordination of communications across diverse programs and channels, while still allowing for program-specific customization and optimization of transmission strategies.

In some embodiments, the term "multichannel computing program transmission object" refers to a messages that is transmitted by a multichannel computing program via at least one multichannel computing program transmission channel. A multichannel computing program transmission object may be implemented as a structured data object that encapsulates the content and metadata of a specific message and/or communication. Serialization techniques may be used to convert a multichannel computing program transmission object into formats suitable for transmission across different multichannel computing program transmission channels.

In some embodiments, the term "multichannel computing program transmission channel" refers to a communication channel via which a multichannel computing program transmits a multichannel computing program transmission object. Examples of a multichannel computing program transmission channel comprise a messaging channel, an email channel, a push channel, an SMS channel, an in-app channel, and/or the like. A multichannel computing program transmission channel may be implemented as a software module and/or service within the multichannel computing program ecosystem, responsible for handling the specifics of communication through a particular medium. These channel modules may be built using specialized communication APIs and protocols, such as SMTP for email channels, Firebase Cloud Messaging for push notifications, and/or WebSockets for real-time in-app messaging. Each multichannel computing program transmission channel may have its own set of configurations, such as rate limiting rules, formatting requirements, and delivery confirmation mechanisms.

In some embodiments, the term "multichannel computing program transmission control model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to generate one or more multichannel computing program transmission controls based on one or more multichannel computing program transmission control factors and/or generate a multichannel computing program transmission package based on one or more multichannel computing program transmission settings and/or one or more multichannel computing program transmission controls. In some embodiments, a multichannel computing program transmission control model is a portion of a composite multichannel computing program transmission package configuration model.

In some embodiments, the term "multichannel computing program transmission package execution model" refers to hardware and/or software comprising parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to be used to perform one or more operations described herein, such as to output a multichannel computing program transmission package to a multichannel computing program.

The terms "data," "content," "digital content," "digital content object," "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

As used herein, the term "computer-readable storage medium" refers to a non-transitory, physical, or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization, or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to computer hardware and/or software that is configured to access a service made available by a server (e.g., an operation and escalation management server). The server is often (but not always) on another computer system, in which case the client device accesses the service by way of a network. Client devices may include, without limitation, smart phones, tablet computers, laptop computers, wearables, personal computers, enterprise computers, and the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, the terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked, or remote computing devices, such as, but not limited to, client devices. Non-limiting examples of an application comprise project management, workflow engines, software incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The terms "database," "repository," and/or similar terms used herein interchangeable may refer to a collection of records or data that is stored in a computer-readable storage medium using one or more database types. The term "database type" may refer to a type of database, such as a hierarchical database, network database, relational database (e.g., Aurora, RDS), entity-relationship database, object database (e.g., S3), document database, semantic database, graph database, noSqL database (e.g., DynamoDB), and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the terms "illustrative," "example," "exemplary" and the like are used to mean "serving as an example, instance, or illustration" with no indication of quality level. Any implementation described herein as "exemplary", or "example" is not necessarily to be construed as preferred or advantageous over other implementations.

The terms "about," "approximately," "generally," "substantially," or the like, when used with a number, may mean that specific number, or alternatively, a range in proximity to the specific number, as understood by persons of skill in the art field and may be used to refer to within manufacturing and/or engineering design tolerances for the corresponding materials and/or elements as would be understood by the person of ordinary skill in the art, unless otherwise indicated.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

If the specification presents a list, unless stated otherwise, it is to be understood that each individual element of that list, and every combination of components of that list, is a separate embodiment. For example, "1, 2, 3, 4, and 5" encompasses, among numerous embodiments, 1; 2; 3; 1 and 2; 3 and 5; 1, 3, and 5; and 1, 2, 4, and 5.

The term "plurality" refers to two or more items.

The term "set" refers to a collection of one or more items.

The term "or" is used herein in both the alternative and conjunctive sense, unless otherwise indicated.

Example Systems and Apparatuses of the Disclosure

Referring now to FIG. 1, an example computing system 100 architecture within which some embodiments of the present disclosure operate is illustrated. The example computing system 100 comprises one or more software development tools 106A-106N, multichannel computing program transmission orchestration system 200, and a plurality of client devices 101A-101N, each communicatively connected through a communications network 102. Accordingly, user(s) (e.g., team member, individual contributor, team leader, team member, designer, etc.) may access the multichannel computing program transmission orchestration system 200 via the communications network 102 using one or more of client devices 101A-101N (e.g., devices configured to host and/or operate multichannel computing programs). Multichannel computing program transmission orchestration system 200 may comprise a multichannel computing program transmission orchestration server 210 in communication with at least one repository, such as a multichannel computing program transmission orchestration repository 220. Such repository (ies) may be hosted by the multichannel computing program transmission orchestration server 210 or otherwise hosted by devices in communication with the multichannel computing program transmission orchestration server 210.

Multichannel computing program transmission orchestration server 210 may include circuitry, networked processors, or the like configured to perform some or all of the multichannel computing program transmission orchestration server-based processes described herein and may be any suitable network server and/or other type of processing device. In some embodiments, multichannel computing program transmission orchestration server 210 may determine and transmit commands and instructions for rendering a multichannel computing program transmission operations interface to client devices 101A-101N, using data from, for example, the multichannel computing program transmission orchestration repository 220. In this regard, the multichannel computing program transmission orchestration server 210 may be embodied by any of a variety of devices, for example, the multichannel computing program transmission orchestration server 210 may be embodied as a computer or a plurality of computers. For example, multichannel computing program transmission orchestration server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, multichannel computing program transmission orchestration server 210 may be located remotely from the multichannel computing program transmission orchestration repository 220, although in other embodiments, the multichannel computing program transmission orchestration server 210 may comprise the multichannel computing program transmission orchestration repository 220. The multichannel computing program transmission orchestration server 210 may, in some embodiments, comprise several servers or computing devices performing interconnected and/or distributed functions. Despite the many arrangements contemplated herein, multichannel computing program transmission orchestration server 210 is shown and described herein as a single computing device to avoid unnecessarily overcomplicating the disclosure.

Multichannel computing program transmission orchestration server 210 can communicate with one or more client devices 101A-101N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 702.11, IEEE 702.16, IEEE 702.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the multichannel computing program transmission orchestration system 200.

The multichannel computing program transmission orchestration repository 220 may be stored by any suitable storage device configured to store some or all of the information described herein (e.g., memory 201 of the multichannel computing program transmission orchestration server 210 or a separate memory system separate from the multichannel computing program transmission orchestration server 210, such as one or more database systems, backend data servers, network databases, cloud storage devices, or the like provided by another device (e.g., online application or 3$^{rd}$ party provider), such as a Network Attached Storage (NAS) device or devices, or as a separate database server or servers. The multichannel computing program transmission orchestration repository 220 may comprise data received from the multichannel computing program transmission orchestration server 210 (e.g., via a memory 201 and/or processor(s) 202), and the corresponding storage device may thus store this data. The multichannel computing program transmission orchestration repository 220 includes information accessed and stored by the multichannel computing program transmission orchestration server 210 to facilitate the operations of the multichannel computing program transmission orchestration system 200. As such, the multichannel computing program transmission orchestration repository 220 may include, for example, include multichannel computing program transmission settings and/or multichannel computing program transmission controls.

Software development tools 106A-106N may be any one or more underlying software development tools (e.g., Bitbucket®, etc.).

The client devices 101A-101N may be implemented as any computing device as defined above. Electronic data received by the multichannel computing program transmission orchestration server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the multichannel computing program transmission operations interface to a user and otherwise providing access to the multichannel computing program transmission orchestration system 200. The depiction in FIG. 2 of "N" client devices is merely for illustration purposes. According to some embodiments, the client devices 101A-101N may be configured to display an interface on a display of the client device for viewing, creating, editing, and/or otherwise interacting with at least the multichannel computing program transmission operations interface, which may be provided by the multichannel computing program transmission orchestration system 200. According to further embodiments, the client devices 101A-101N may be configured to generate and/or display a multichannel computing program transmission setting interface component, a multichannel computing program technical operational graph structure interface component, a multichannel computing program entity operational graph structure interface component, a multichannel computing program event operational graph structure interface component, a multichannel computing program operational graph structure interface component, and/or the like.

In embodiments where a client device 101A-101N is a mobile device, such as a smartphone or tablet, the client device 101A-101N may execute an "app" to interact with the multichannel computing program transmission orchestration system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the multichannel computing program transmission orchestration system 200 via a web browser. As yet another example, the client devices 101A-101N may include various hardware or firmware designed to interface with the multichannel computing program transmission orchestration system 200.

Example Apparatus for Implementing Embodiments of the Present Disclosure

FIG. 2 illustrates an example multichannel computing program transmission orchestration server 210 in accordance with at least some example embodiments of the present disclosure. In accordance with some example embodiments, multichannel computing program transmission orchestration server 210 may include various components, modules, circuitries, or means, some or all of which may be also or instead be included in one or more client device(s) 101A-101N. In accordance with some example embodiments, multichannel computing program transmission orchestration server 210 may be configured, using one or more of the sets of circuitry embodying memory 201, processor 202, input/output circuitry 203, communications circuitry 204, and/or multichannel computing program transmission orchestration circuitry 205 to execute and perform the operations described herein. In some embodiments, multichannel computing program transmission orchestration circuitry 205 is included in multichannel computing program transmission orchestration server 210 and/or client device 101A, the circuitry configured to facilitate the functionality discussed herein regarding generating a multichannel computing program transmission setting interface component, a multichannel computing program technical operational graph structure interface component, a multichannel computing program entity operational graph structure interface component, a multichannel computing program event operational graph structure interface component, a multichannel computing program operational graph structure interface component, and/or the like. It will be appreciated that while various references are made herein to a "server" or "servers" such references are not intended to implicate monolithic servers. Rather, as will be apparent to one of ordinary skill in the art in view of this disclosure, the operations and functionality attributed to any disclosed server may be performed in a cloud computing environment and thereby completed by multiple servers.

Although the use of the term "circuitry" as used herein with respect to components 201-205 are described in some cases with respect to functional limitations, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" with respect to components of the apparatuses described herein should therefore be understood to include particular hardware configured to perform the functions associated with the respective components or particular circuitry as described herein.

The term "circuitry" should also be understood, in some embodiments, to include software for configuring the hardware. For example, in some embodiments, "circuitry" may include processing circuitry, storage media, network interfaces, input/output devices, and the like. In some embodiments, such as in examples where circuitry is included with multichannel computing program transmission orchestration server 210, other elements of the multichannel computing program transmission orchestration server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, multichannel computing program transmission orchestration server 210. The memory 201 is non-transitory and may include, for example, one or more volatile and/or non-volatile memories, or some combination thereof. In other words, for example, the memory 201 may be an electronic storage device (e.g., a computer readable storage medium). The memory 201 may be configured to store information, data, content, applications, instructions, or the like, for enabling an apparatus, e.g., multichannel computing program transmission orchestration server 210 to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling the multichannel computing program transmission orchestration server 210 to carry out various functions in accordance with example embodiments discussed herein. For example, in at least some embodiments, memory 201 is configured to buffer data for processing by processor 202. Additionally, or alternatively, in at least some embodiments, memory 201 is configured to store program instructions for execution by processor 202. Memory 201 may store information in the form of static and/or dynamic information. This stored information may be stored and/or used by multichannel computing program transmission orchestration server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors.

Accordingly, although illustrated in FIG. 2 as a single processor, in some embodiments, processor 202 comprises a plurality of processors. The plurality of processors may be embodied on a single computing device or may be distributed across a plurality of such devices collectively configured to function as the multichannel computing program transmission orchestration server 210. The plurality of processors may be in operative communication with each other and may be collectively configured to perform one or more functionalities of multichannel computing program transmission orchestration server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause multichannel computing program transmission orchestration server 210 to perform one or more of the functionalities of multichannel computing program transmission orchestration server 210 as described herein.

In some embodiments, input/output circuitry 203 may, in turn, be in communication with processor 202 to provide an audible, visual, mechanical, or other output and/or, in some embodiments, to receive an indication of an input. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface (e.g., multichannel computing program transmission operations interface) and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 in multichannel computing program transmission orchestration server 210 may be reduced when implemented also or instead as an end-user machine or other type of device designed for complex user interactions (i.e., client device 101). In some embodiments (like other components discussed herein), input/output circuitry 203 may even be eliminated from multichannel computing program transmission orchestration server 210. Alternatively, at least some aspects of input/output circuitry 203 may be embodied on an apparatus used by a user (e.g., a team member, an individual contributor, a team leader, and/or the like) that is in communication with multichannel computing program transmission orchestration server 210. Input/output circuitry 203 may be in communication with memory 201, communications circuitry 204, and/or any other component (s), such as via a bus. Although more than one input/output circuitry and/or other component can be included in multichannel computing program transmission orchestration server 210, only one is shown in FIG. 2 to avoid overcomplicating the disclosure (e.g., like the other components discussed herein).

Communications circuitry 204 may be any means such as a device or circuitry embodied in either hardware or a combination of hardware and software that is configured to receive and/or transmit data from/to a network and/or any other device, circuitry, or module in communication with multichannel computing program transmission orchestration server 210. In this regard, the communications circuitry 204 may include, for example, a network interface for enabling communications with a wired or wireless communication network. Communications circuitry 204 may be configured to receive and/or transmit any data that may be stored by memory 201 using any protocol that may be used for communications between computing devices. For example, the communications circuitry 204 may include one or more network interface cards, antennae, transmitters, receivers, buses, switches, routers, modems, and supporting hardware and/or software, and/or firmware/software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by multichannel computing program transmission orchestration server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of multichannel computing program transmission orchestration server 210, such as via a bus.

In some embodiments, multichannel computing program transmission orchestration circuitry 205 may also or instead be included and configured to perform the functionality discussed herein related to providing a multichannel computing program transmission setting interface component, a multichannel computing program technical operational graph structure interface component, a multichannel computing program entity operational graph structure interface component, a multichannel computing program event operational graph structure interface component, a multichannel computing program operational graph structure interface component, and/or the like. Multichannel computing program transmission orchestration circuitry 205 includes hardware components and/or software configured to support interface component functionality, features, and/or services of the multichannel computing program transmission orchestration server 210. In some embodiments, for example multichannel computing program transmission orchestration circuitry 205 includes hardware components and/or software configured to generate, perform, cause, initiate, execute, and/or implement services of the multichannel computing program transmission orchestration server 210. The multichannel computing program transmission orchestration circuitry 205 may utilize processing circuitry, such as the processor 202, to perform its corresponding operations, and may utilize memory 201 to store collected information. The multichannel computing program transmission orchestration circuitry 205 may send and/or receive data from the multichannel computing program transmission orchestration repository 220.

It should also be appreciated that, in some embodiments, the multichannel computing program transmission orchestration circuitry 205 may include a separate processor, specially configured field programmable gate array (FPGA), or application specific interface circuit (ASIC) to perform its corresponding functions. For example, in some embodiments, some or all of the functionality of multichannel computing program transmission orchestration circuitry 205 may be performed by processor 202. In this regard, some or all of the example processes and algorithms discussed herein can be performed by at least one processor 202 and/or multichannel computing program transmission orchestration circuitry 205. For example, non-transitory computer readable storage media can be configured to store firmware, one or more application programs, and/or other software, which include instructions and other computer-readable program code portions that can be executed to control processors of the components of multichannel computing program transmission orchestration server 210 to implement various operations, including the examples shown herein. As such, a series of computer-readable program code portions may be embodied in one or more computer program products and can be used, with a device, multichannel computing program transmission orchestration server 210, database, and/or other programmable apparatus, to produce the machine-implemented processes discussed herein. It is also noted that all or some of the information discussed herein can be based on data that is received, generated and/or maintained by one or more components of the multichannel computing program transmission orchestration server 210. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor, or other programmable apparatus's circuitry to produce a machine, such that the computer, processor, or other programmable circuitry that execute the code on the machine creates the means for implementing various functions, including those described herein in connection with the components of multichannel computing program transmission orchestration server 210.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a planning user interacting with the client device). Information/data generated at the client device (e.g., a result of the user interaction) can be received from the client device at the server.

FIG. 3 illustrates and example architecture of the multichannel computing program transmission orchestration system 200. In this regard, in some embodiments, the multichannel computing program transmission orchestration system 200 is configured to receive one or more multichannel computing program operational transmissions from one or more multichannel computing programs. For example, the multichannel computing program transmission orchestration system 200 may be configured to receive a set of multichannel computing program operational transmissions from one or more of an object orchestration multichannel computing program 302, a technology operations multichannel computing program 304, and/or a software development multichannel computing program 306.

In some embodiments, a multichannel computing program operational graph structure preprocessing model 308 of the multichannel computing program transmission orchestration system 200 is configured to generate a set of subsidiary multichannel computing program operational graph structures based on at least one of the set of multichannel computing program operational transmissions. In some embodiments, one or more of the set of subsidiary multichannel computing program operational graph structures comprises a multichannel computing program operational item and a multichannel computing program operational connection.

In some embodiments, a multichannel computing program operational graph structure augmentation model 310 of the multichannel computing program transmission orchestration system 200 is configured to configure at least one multichannel computing program operational item. In some embodiments, a multichannel computing program operational graph structure model 312 of the multichannel computing program transmission orchestration system 200 is configured to generate a multichannel computing program operational graph structure based on the set of subsidiary multichannel computing program operational graph structures. For example, the multichannel computing program operational graph structure model 312 may generate the multichannel computing program operational graph structure after the multichannel computing program operational graph structure augmentation model 310 has configured at least one multichannel computing program operational item.

In some embodiments, a composite multichannel computing program transmission package configuration model 314 of the multichannel computing program transmission orchestration system 200 is configured to generate one or more multichannel computing program transmission packages using the computing program operational graph structure. For example, a first multichannel computing program transmission control may be generated using the composite multichannel computing program transmission package configuration model 314. In some embodiments, a multichannel computing program transmission package execution model 316 of the multichannel computing program transmission orchestration system 200 is configured to output the one or more multichannel computing program transmission packages to the one or more multichannel computing programs.

In various embodiments of the present disclosure, an apparatus (e.g., the multichannel computing program transmission orchestration server 210) may be configured to generate, output, manage, and/or cause rendering of a multichannel computing program transmission setting interface component of a multichannel computing program transmission orchestration system 200. For example, an apparatus (e.g., the multichannel computing program transmission orchestration server 210) may be configured to output and/or cause rendering of a multichannel computing program transmission setting interface component on a multichannel computing program transmission operations interface 400 of the multichannel computing program transmission orchestration system 200.

FIG. 4 illustrates an example multichannel computing program transmission setting interface component 402 structured in accordance with various embodiments of the present disclosure. In some embodiments, the apparatus (e.g., multichannel computing program transmission orchestration server 210) causes rendering of the multichannel computing program transmission setting interface component 402 to a visual display of a computing device (e.g., a client device 101A-101N, a computing device associated with the multichannel computing program transmission orchestration system 200, etc.). In some embodiments, the multichannel computing program transmission setting interface component 402 comprises a first multichannel computing program transmission setting command representation 402A corresponding to a first multichannel computing program transmission setting command. Additionally, or alternatively, the multichannel computing program transmission setting interface component 402 comprises a second multichannel computing program transmission setting command representation 402B corresponding to a second multichannel computing program transmission setting command.

In various embodiments of the present disclosure, an apparatus (e.g., the multichannel computing program transmission orchestration server 210) may be configured to generate, output, manage, and/or cause rendering of a multichannel computing program technical operational graph structure interface component of a multichannel computing program transmission orchestration system 200. For example, an apparatus (e.g., the multichannel computing program transmission orchestration server 210) may be configured to output and/or cause rendering of a multichannel computing program technical operational graph structure interface component on a multichannel computing program transmission operations interface 400 of the multichannel computing program transmission orchestration system 200.

FIG. 5 illustrates an example multichannel computing program technical operational graph structure interface component 510 structured in accordance with various embodiments of the present disclosure. In some embodiments, the apparatus (e.g., multichannel computing program transmission orchestration server 210) causes rendering of the multichannel computing program technical operational graph structure interface component 510 to a visual display of a computing device (e.g., a client device 101A-101N, a computing device associated with the multichannel computing program transmission orchestration system 200, etc.). In some embodiments, the multichannel computing program technical operational graph structure interface component 510 comprises at least one of a multichannel computing program technical level item representation 502, a multichannel computing program technical type item representation 504, a multichannel computing program technical identifier item representation 506, and/or a multichannel computing program operational technical connection representation 508.

In various embodiments of the present disclosure, an apparatus (e.g., the multichannel computing program transmission orchestration server 210) may be configured to generate, output, manage, and/or cause rendering of a multichannel computing program entity operational graph structure interface component of a multichannel computing program transmission orchestration system 200. For example, an apparatus (e.g., the multichannel computing program transmission orchestration server 210) may be configured to output and/or cause rendering of a multichannel computing program entity operational graph structure interface component on a multichannel computing program transmission operations interface 400 of the multichannel computing program transmission orchestration system 200.

FIG. 6 illustrates an example multichannel computing program entity operational graph structure interface component 612 structured in accordance with various embodiments of the present disclosure. In some embodiments, the apparatus (e.g., multichannel computing program transmission orchestration server 210) causes rendering of the multichannel computing program entity operational graph structure interface component 612 to a visual display of a computing device (e.g., a client device 101A-101N, a computing device associated with the multichannel computing program transmission orchestration system 200, etc.). In some embodiments, the multichannel computing program entity operational graph structure interface component 612 comprises at least one of a multichannel computing program entity segment item representation 602, a multichannel computing program entity identifier item representation 604, a multichannel computing program entity client item representation 606, a multichannel computing program entity role item representation 608, and/or a multichannel computing program operational entity connection representation 610.

In various embodiments of the present disclosure, an apparatus (e.g., the multichannel computing program transmission orchestration server 210) may be configured to generate, output, manage, and/or cause rendering of a multichannel computing program event operational graph structure interface component of a multichannel computing program transmission orchestration system 200. For example, an apparatus (e.g., the multichannel computing program transmission orchestration server 210) may be configured to output and/or cause rendering of a multichannel computing program event operational graph structure interface component on a multichannel computing program transmission operations interface 400 of the multichannel computing program transmission orchestration system 200.

FIG. 7 illustrates an example multichannel computing program event operational graph structure interface component 710 structured in accordance with various embodiments of the present disclosure. In some embodiments, the apparatus (e.g., multichannel computing program transmission orchestration server 210) causes rendering of the multichannel computing program event operational graph structure interface component 710 to a visual display of a computing device (e.g., a client device 101A-101N, a computing device associated with the multichannel computing program transmission orchestration system 200, etc.). In some embodiments, the multichannel computing program event operational graph structure interface component 710 comprises at least one of a multichannel computing program event location item representation 702, a multichannel computing program event client item representation 704, a multichannel computing program event identifier item representation 706, and/or a multichannel computing program operational event connection representation 708.

In various embodiments of the present disclosure, an apparatus (e.g., the multichannel computing program transmission orchestration server 210) may be configured to generate, output, manage, and/or cause rendering of a multichannel computing program operational graph structure interface component of a multichannel computing program transmission orchestration system 200. For example, an apparatus (e.g., the multichannel computing program transmission orchestration server 210) may be configured to output and/or cause rendering of a multichannel computing program operational graph structure interface component on a multichannel computing program transmission operations interface 400 of the multichannel computing program transmission orchestration system 200.

FIG. 8 illustrates an example multichannel computing program operational graph structure interface component 802 structured in accordance with various embodiments of the present disclosure. In some embodiments, the apparatus (e.g., multichannel computing program transmission orchestration server 210) causes rendering of the multichannel computing program operational graph structure interface component 802 to a visual display of a computing device (e.g., a client device 101A-101N, a computing device associated with the multichannel computing program transmission orchestration system 200, etc.). In some embodiments, the multichannel computing program operational graph structure interface component 802 comprises at least one of a multichannel computing program technical level item representation 502, a multichannel computing program technical type item representation 504, a multichannel computing program technical identifier item representation 506, a multichannel computing program operational technical connection representation 508, a multichannel computing program event location item representation 702, a multichannel computing program event client item representation 704, a multichannel computing program operational event connection representation 708, a multichannel computing program entity segment item representation 602, a multichannel computing program entity identifier item representation 604, a multichannel computing program entity role item representation 608, and/or a multichannel computing program operational entity connection representation 610. Said differently, for example, the multichannel computing program operational graph structure interface component 802 may comprise various combinations of multichannel computing program item representations and multichannel computing program connections illustrated in one or more of FIGS. 5-7.

Example Operations Performed

Having described example systems and apparatuses and exemplary circuitry in accordance with various embodiments of the present disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof. The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 9 is a flowchart broadly illustrating a series of operations or process blocks that are executed or performed to output a first multichannel computing program transmission package to a first multichannel computing program and/or a second multichannel computing program transmission package to a second multichannel computing program, in accordance with some example embodiments of the present disclosure. In some embodiments, the method 900 is embodied by computer program code stored on a non-transitory computer-readable storage medium of a computer program product configured for execution to perform the process as depicted and described. In this regard, in some such embodiments, the multichannel computing program transmission orchestration server 210 is specially configured by computer-coded instructions (e.g., computer program instructions) stored thereon, for example in the memory 201 and/or another component depicted and/or described herein and/or otherwise accessible to the multichannel computing program transmission orchestration server 210, for performing the operations as depicted and described. Alternatively, or additionally, in some embodiments, the method 900 is performed by one or more specially configured computing devices, such as the multichannel computing program transmission orchestration server 210 alone or in communication with one or more other component(s), device(s), system(s), and/or the like. For example, in some embodiments, the multichannel computing program transmission orchestration server 210 is in communication with one or more external apparatus(es), system(s), device(s), and/or the like, to perform one or more of the operations as depicted and described. For purposes of simplifying the description, the method 900 is described as performed by and from the perspective of the multichannel computing program transmission orchestration server 210. In this regard, performance of the operations may invoke one or more of memory 201, processor 202, input/output circuitry 203, communications circuitry 204, and/or multichannel computing program transmission orchestration circuitry 205.

In the embodiment illustrated in FIG. 9, the flowchart illustrates method 900 which begins at block 902. At block 902, the multichannel computing program transmission orchestration server 210, includes means, such as the memory 201, processor 202, input/output circuitry 203, communications circuitry 204, and/or multichannel computing program transmission orchestration circuitry 205, or a combination thereof, to receive a set of multichannel computing program operational transmissions. For example, a first multichannel computing program operational transmission of the set of multichannel computing program operational transmissions is received from a first multichannel computing program of a plurality of multichannel computing programs and a second multichannel computing program operational transmission of the set of multichannel computing program operational transmissions is received from a second multichannel computing program of the plurality of multichannel computing programs.

At block 904, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program operational graph structure. For example, the multichannel computing program operational graph structure comprises a plurality of multichannel computing program operational items and a plurality of multichannel computing program operational connections.

At block 906, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate one or more multichannel computing program transmission packages. For example, the multichannel computing program transmission orchestration service 120 may be configured to generate, using the multichannel computing program operational graph structure, the first multichannel computing program transmission package for the first multichannel computing program and the second multichannel computing program transmission package for the second multichannel computing program.

At block 908, the multichannel computing program transmission orchestration server 210, includes means, such as the memory 201, processor 202, input/output circuitry 203, communications circuitry 204, and/or multichannel computing program transmission orchestration circuitry 205, or a combination thereof, to output the one or more multichannel computing program transmission packages. For example, the multichannel computing program transmission orchestration service 120 may be configured to output the first multichannel computing program transmission package to the first multichannel computing program and the second multichannel computing program transmission package to the second multichannel computing program. In some embodiments, the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels.

At block 910, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program operational graph structure interface component. In some embodiments, the multichannel computing program operational graph structure interface component comprises a multichannel computing program operational graph structure representation.

At block 912, the multichannel computing program transmission orchestration server 210, includes means, such as the memory 201, processor 202, input/output circuitry 203, communications circuitry 204, and/or multichannel computing program transmission orchestration circuitry 205, or a combination thereof, to output the multichannel computing program operational graph structure interface component. For example, the multichannel computing program transmission orchestration service 120 may be configured to output the multichannel computing program operational graph structure interface component for rendering to a multichannel computing program transmission operations interface.

FIG. 10 is a flowchart broadly illustrating a series of operations or process blocks that are executed or performed to generate a multichannel computing program operational graph structure, in accordance with some example embodiments of the present disclosure. In some embodiments, the method 1000 is embodied by computer program code stored on a non-transitory computer-readable storage medium of a computer program product configured for execution to perform the process as depicted and described. In this regard, in some such embodiments, the multichannel computing program transmission orchestration server 210 is specially configured by computer-coded instructions (e.g., computer program instructions) stored thereon, for example in the memory 201 and/or another component depicted and/or described herein and/or otherwise accessible to the multichannel computing program transmission orchestration server 210, for performing the operations as depicted and described. Alternatively, or additionally, in some embodiments, the method 1000 is performed by one or more specially configured computing devices, such as the multichannel computing program transmission orchestration server 210 alone or in communication with one or more other component(s), device(s), system(s), and/or the like. For example, in some embodiments, the multichannel computing program transmission orchestration server 210 is in communication with one or more external apparatus(es), system(s), device(s), and/or the like, to perform one or more of the operations as depicted and described. For purposes of simplifying the description, the method 1000 is described as performed by and from the perspective of the multichannel computing program transmission orchestration server 210. In this regard, performance of the operations may invoke one or more of memory 201, processor 202, input/output circuitry 203, communications circuitry 204, and/or multichannel computing program transmission orchestration circuitry 205.

In the embodiment illustrated in FIG. 10, the flowchart illustrates method 1000 which begins at block 1002. At block 1002, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a set of subsidiary multichannel computing program operational graph structures. In some embodiments, at least a first subsidiary multichannel computing program operational graph structure of the set of subsidiary multichannel computing program operational graph structures comprises at least one of the plurality of multichannel computing program operational items and at least one of the plurality of multichannel computing program operational connections.

At block 1004, the multichannel computing program transmission orchestration server 210, includes means, such as the memory 201, processor 202, input/output circuitry 203, communications circuitry 204, and/or multichannel computing program transmission orchestration circuitry 205, or a combination thereof, to configure a multichannel computing program operational item. For example, the computing program transmission orchestration server 210 is configured to configure a first multichannel computing program operational item of the plurality of multichannel computing program operational items based on a multichannel computing program operations augmentation feature.

At block 1006, the multichannel computing program transmission orchestration server 210, includes means, such as the memory 201, processor 202, input/output circuitry 203, communications circuitry 204, and/or multichannel computing program transmission orchestration circuitry 205, or a combination thereof, to extract a multichannel computing program technical feature. For example, the computing program transmission orchestration server 210 is configured to extract a multichannel computing program technical feature from the first multichannel computing program operational transmission or the second multichannel computing program operational transmission.

At block 1008, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program operational technical item. For example, the computing program transmission orchestration server 210 is configured to generate a multichannel computing program operational technical item and a multichannel computing program operational technical connection based on the multichannel computing program technical feature and a multichannel computing program network configuration feature.

At block 1010, the multichannel computing program transmission orchestration server 210, includes means, such as the memory 201, processor 202, input/output circuitry 203, communications circuitry 204, and/or multichannel computing program transmission orchestration circuitry 205, or a combination thereof, to extract a multichannel computing program entity feature. For example, the computing program transmission orchestration server 210 is configured to extract a multichannel computing program entity feature from the first multichannel computing program operational transmission or the second multichannel computing program operational transmission.

At block 1012, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program operational entity item. For example, the computing program transmission orchestration server 210 is configured to generate a multichannel computing program operational entity item and a multichannel computing program operational entity connection based on the multichannel computing program entity feature and a multichannel computing program network operational feature.

At block 1014, the multichannel computing program transmission orchestration server 210, includes means, such as the memory 201, processor 202, input/output circuitry 203, communications circuitry 204, and/or multichannel computing program transmission orchestration circuitry 205, or a combination thereof, to extract a multichannel computing program event feature. For example, the computing program transmission orchestration server 210 is configured to extract a multichannel computing program event feature from the first multichannel computing program operational transmission or the second multichannel computing program operational transmission.

At block 1016, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program operational event item. For example, the computing program transmission orchestration server 210 is configured to generate a multichannel computing program operational event item and a multichannel computing program operational event connection based on the multichannel computing program event feature.

FIG. 11 is a flowchart broadly illustrating a series of operations or process blocks that are executed or performed to output a first multichannel computing program transmission package to a first multichannel computing program and/or a second multichannel computing program transmission package to a second multichannel computing program, in accordance with some example embodiments of the present disclosure. In some embodiments, the method 1100 is embodied by computer program code stored on a non-transitory computer-readable storage medium of a computer program product configured for execution to perform the process as depicted and described. In this regard, in some such embodiments, the multichannel computing program transmission orchestration server 210 is specially configured by computer-coded instructions (e.g., computer program instructions) stored thereon, for example in the memory 201 and/or another component depicted and/or described herein and/or otherwise accessible to the multichannel computing program transmission orchestration server 210, for performing the operations as depicted and described. Alternatively, or additionally, in some embodiments, the method 1100 is performed by one or more specially configured computing devices, such as the multichannel computing program transmission orchestration server 210 alone or in communication with one or more other component(s), device(s), system(s), and/or the like. For example, in some embodiments, the multichannel computing program transmission orchestration server 210 is in communication with one or more external apparatus(es), system(s), device(s), and/or the like, to perform one or more of the operations as depicted and described. For purposes of simplifying the description, the method 1100 is described as performed by and from the perspective of the multichannel computing program transmission orchestration server 210. In this regard, performance of the operations may invoke one or more of memory 201, processor 202, input/output circuitry 203, communications circuitry 204, and/or multichannel computing program transmission orchestration circuitry 205.

In the embodiment illustrated in FIG. 11, the flowchart illustrates method 1100 which begins at block 1102. At block 1102, the multichannel computing program transmission orchestration server 210, includes means, such as the memory 201, processor 202, input/output circuitry 203, communications circuitry 204, and/or multichannel computing program transmission orchestration circuitry 205, or a combination thereof, to receive one or more multichannel computing program transmission settings. For example, the computing program transmission orchestration server 210 is configured to receive a first multichannel computing program transmission setting for a first multichannel computing program of a plurality of multichannel computing programs and a second multichannel computing program transmission setting for a second multichannel computing program of the plurality of multichannel computing programs.

At block 1104, the multichannel computing program transmission orchestration server 210, includes means, such as the memory 201, processor 202, input/output circuitry 203, communications circuitry 204, and/or multichannel computing program transmission orchestration circuitry 205, or a combination thereof, to receive a set of multichannel computing program operational transmissions. In some embodiments, a first multichannel computing program operational transmission of the set of multichannel computing program operational transmissions is received from the first multichannel computing program and a second multichannel computing program operational transmission of the set of multichannel computing program operational transmissions is received from the second multichannel computing program.

At block 1106, the multichannel computing program transmission orchestration server 210, includes means, such as the memory 201, processor 202, input/output circuitry 203, communications circuitry 204, and/or multichannel computing program transmission orchestration circuitry 205, or a combination thereof, to identify a multichannel computing program operational action event. In some embodiments, the multichannel computing program operational action event associated with at least one of the plurality of multichannel computing programs.

At block 1108, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate one or more multichannel computing program transmission controls. For example, the computing program transmission orchestration server 210 is configured to generate, using a multichannel computing program operational graph structure, a first multichannel computing program transmission control for the first multichannel computing program based on the multichannel computing program operational action event and a second multichannel computing program transmission control for the second multichannel computing program based on the multichannel computing program operational action event.

At block 1110, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate one or more multichannel computing program transmission packages. For example, the computing program transmission orchestration server 210 is configured to generate the first multichannel computing program transmission package for the first multichannel computing program based on the first multichannel computing program transmission setting and the first multichannel computing program transmission control and the second multichannel computing program transmission package for the second multichannel computing program based on the second multichannel computing program transmission setting and the second multichannel computing program transmission control.

At block 1112, the multichannel computing program transmission orchestration server 210, includes means, such as the memory 201, processor 202, input/output circuitry 203, communications circuitry 204, and/or multichannel computing program transmission orchestration circuitry 205, or a combination thereof, to output the one or more multichannel computing program transmission packages. For example, the computing program transmission orchestration server 210 is configured to output the first multichannel computing program transmission package to the first multichannel computing program and the second multichannel computing program transmission package to the second multichannel computing program. In some embodiments, the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels.

FIG. 12 is a flowchart broadly illustrating a series of operations or process blocks that are executed or performed to output a set of multichannel computing program transmission control factors, in accordance with some example embodiments of the present disclosure. In some embodiments, the method 1200 is embodied by computer program code stored on a non-transitory computer-readable storage medium of a computer program product configured for execution to perform the process as depicted and described. In this regard, in some such embodiments, the multichannel computing program transmission orchestration server 210 is specially configured by computer-coded instructions (e.g., computer program instructions) stored thereon, for example in the memory 201 and/or another component depicted and/or described herein and/or otherwise accessible to the multichannel computing program transmission orchestration server 210, for performing the operations as depicted and described. Alternatively, or additionally, in some embodiments, the method 1200 is performed by one or more specially configured computing devices, such as the multichannel computing program transmission orchestration server 210 alone or in communication with one or more other component(s), device(s), system(s), and/or the like. For example, in some embodiments, the multichannel computing program transmission orchestration server 210 is in communication with one or more external apparatus(es), system(s), device(s), and/or the like, to perform one or more of the operations as depicted and described. For purposes of simplifying the description, the method 1200 is described as performed by and from the perspective of the multichannel computing program transmission orchestration server 210. In this regard, performance of the operations may invoke one or more of memory 201, processor 202, input/output circuitry 203, communications circuitry 204, and/or multichannel computing program transmission orchestration circuitry 205.

In the embodiment illustrated in FIG. 12, the flowchart illustrates method 1200 which begins at block 1202. At block 1202, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program transmission priority control factor. In some embodiments, to generate a multichannel computing program transmission priority control factor the multichannel computing program transmission orchestration server 210 is configured to apply a multichannel computing program entity operational item of the multichannel computing program operational graph structure to a transmission priority control model.

At block 1204, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program transmission temporal control factor. In some embodiments, to generate a multichannel computing program transmission temporal control factor the multichannel computing program transmission orchestration server 210 is configured to apply at least one of a multichannel computing program entity operational item of the multichannel computing program operational graph structure or the multichannel computing program operational action event to a transmission temporal control model.

At block 1206, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program transmission performance control factor. In some embodiments, to generate a multichannel computing program transmission performance control factor the multichannel computing program transmission orchestration server 210 is configured to apply the multichannel computing program transmission temporal control factor to a transmission performance control model.

At block 1208, the multichannel computing program transmission orchestration server 210, includes means, such as the memory 201, processor 202, input/output circuitry 203, communications circuitry 204, and/or multichannel computing program transmission orchestration circuitry 205, or a combination thereof, to generate a multichannel computing program transmission sentiment control factor. In some embodiments, to generate a multichannel computing program transmission sentiment control factor the multichannel computing program transmission orchestration server 210 is configured to apply at least one of a multichannel computing program entity operational item of the multichannel computing program operational graph structure or the multichannel computing program operational action event to a transmission sentiment control model.

FIGS. 9, 10, 11, and 12 thus illustrate flowcharts describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the multichannel computing program transmission orchestration server 210 and executed by a processor 202 of the multichannel computing program transmission orchestration server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of the present disclosure or of what may be claimed, but rather as description of features specific to particular embodiments of the present disclosure. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus configured for outputting a first multichannel computing program transmission package and a second multichannel computing program transmission package, the apparatus comprising at least one processor, and at least one memory including program code, the at least one memory and the program code configured to, with the at least one processor, cause the apparatus to at least:

receive a first multichannel computing program transmission setting for a first multichannel computing program of a plurality of multichannel computing programs and a second multichannel computing program transmission setting for a second multichannel computing program of the plurality of multichannel computing programs;

receive a set of multichannel computing program operational transmissions, wherein a first multichannel computing program operational transmission of the set of multichannel computing program operational transmissions is received from the first multichannel computing program and a second multichannel computing program operational transmission of the set of multichannel computing program operational transmissions is received from the second multichannel computing program;

identify a multichannel computing program operational action event associated with at least one of the plurality of multichannel computing programs;

generate, using a multichannel computing program operational graph structure, a first multichannel computing program transmission control for the first multichannel computing program based on the multichannel computing program operational action event and a second multichannel computing program transmission control for the second multichannel computing program based on the multichannel computing program operational action event;

generate the first multichannel computing program transmission package for the first multichannel computing program based on the first multichannel computing program transmission setting and the first multichannel computing program transmission control and the second multichannel computing program transmission package for the second multichannel computing program based on the second multichannel computing program transmission setting and the second multichannel computing program transmission control; and output the first multichannel computing program transmission package to the first multichannel computing program and the second multichannel computing program transmission package to the second multichannel computing program, wherein the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels.

2. The apparatus of claim 1, wherein the first multichannel computing program transmission package configures the first multichannel computing program to transmit the first multichannel computing program transmission object via the first multichannel computing program transmission channel based on the first multichannel computing program transmission setting and the first multichannel computing program transmission control.

3. The apparatus of claim 1, wherein the multichannel computing program operational graph structure is generated using the set of multichannel computing program operational transmissions.

4. The apparatus of claim 1, wherein to receive the first multichannel computing program transmission setting or the second multichannel computing program transmission setting comprises the program code being further configured to, with the at least one processor, cause the apparatus to:

generate a multichannel computing program transmission setting interface component, wherein the multichannel computing program transmission setting interface component comprises one or more multichannel computing program transmission setting command representations;

output the multichannel computing program transmission setting interface component for rendering to a multichannel computing program transmission operations interface; and receive the first multichannel computing program transmission setting or the second multichannel computing program transmission setting via the multichannel computing program transmission setting interface component.

5. The apparatus of claim 1, wherein the plurality of multichannel computing programs comprises at least one of an object orchestration multichannel computing program, a technology operations multichannel computing program, or a software development multichannel computing program.

6. The apparatus of claim 1, wherein to generate the first multichannel computing program transmission control or the second multichannel computing program transmission control comprises the program code being further configured to, with the at least one processor, cause the apparatus to:

generate, using the multichannel computing program operational graph structure, a set of multichannel computing program transmission control factors; and generate the first multichannel computing program transmission control or the second multichannel computing program transmission control based on at least one of the set of multichannel computing program transmission control factors.

7. The apparatus of claim 6, wherein the set of multichannel computing program transmission control factors comprises a multichannel computing program transmission priority control factor and wherein to generate the multichannel computing program transmission priority control factor comprises the program code being further configured to, with the at least one processor, cause the apparatus to apply a multichannel computing program entity operational item of the multichannel computing program operational graph structure to a transmission priority control model.

8. The apparatus of claim 6, wherein the set of multichannel computing program transmission control factors comprises a multichannel computing program transmission temporal control factor and wherein to generate the multichannel computing program transmission temporal control factor comprises the program code being further configured to, with the at least one processor, cause the apparatus to apply at least one of a multichannel computing program entity operational item of the multichannel computing program operational graph structure or the multichannel computing program operational action event to a transmission temporal control model.

9. The apparatus of claim 8, wherein the set of multichannel computing program transmission control factors comprises a multichannel computing program transmission performance control factor and wherein to generate the multichannel computing program transmission performance control factor comprises the program code being further configured to, with the at least one processor, cause the apparatus to apply the multichannel computing program transmission temporal control factor to a transmission performance control model.

10. The apparatus of claim 6, wherein the set of multichannel computing program transmission control factors comprises a multichannel computing program transmission sentiment control factor and wherein to generate the multichannel computing program transmission sentiment control factor comprises the program code being further configured to, with the at least one processor, cause the apparatus to apply at least one of a multichannel computing program entity operational item of the multichannel computing program operational graph structure or the multichannel computing program operational action event to a transmission sentiment control model.

11. The apparatus of claim 1, wherein the first multichannel computing program transmission control is generated using a composite multichannel computing program transmission package configuration model.

12. The apparatus of claim 1, wherein the first multichannel computing program transmission package is outputted using a multichannel computing program transmission package execution model.

13. A method for outputting a first multichannel computing program transmission package and a second multichannel computing program transmission package, comprising:

receiving a first multichannel computing program transmission setting for a first multichannel computing program of a plurality of multichannel computing programs and a second multichannel computing program transmission setting for a second multichannel computing program of the plurality of multichannel computing programs;

receiving a set of multichannel computing program operational transmissions, wherein a first multichannel computing program operational transmission of the set of multichannel computing program operational transmissions is received from the first multichannel computing program and a second multichannel computing program operational transmission of the set of multichannel computing program operational transmissions is received from the second multichannel computing program;

identifying a multichannel computing program operational action event associated with at least one of the plurality of multichannel computing programs;

generating, using a multichannel computing program operational graph structure, a first multichannel computing program transmission control for the first multichannel computing program based on the multichannel computing program operational action event and a second multichannel computing program transmission control for the second multichannel computing program based on the multichannel computing program operational action event;

generating the first multichannel computing program transmission package for the first multichannel computing program based on the first multichannel computing program transmission setting and the first multichannel computing program transmission control and the second multichannel computing program transmission package for the second multichannel computing program based on the second multichannel computing program transmission setting and the second multichannel computing program transmission control; and outputting the first multichannel computing program transmission package to the first multichannel computing program and the second multichannel computing program transmission package to the second multichannel computing program, wherein the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels wherein the first multichannel computing program transmission package is outputted using a multichannel computing program transmission package execution model.

14. The method of claim 13, wherein the first multichannel computing program transmission package configures the first multichannel computing program to transmit the first multichannel computing program transmission object via the first multichannel computing program transmission channel based on the first multichannel computing program transmission setting and the first multichannel computing program transmission control.

15. The method of claim 13, wherein the multichannel computing program operational graph structure is generated using the set of multichannel computing program operational transmissions.

16. The method of claim 13, wherein to receive the first multichannel computing program transmission setting or the second multichannel computing program transmission setting comprises:

generating a multichannel computing program transmission setting interface component, wherein the multichannel computing program transmission setting interface component comprises one or more multichannel computing program transmission setting command representations;

outputting the multichannel computing program transmission setting interface component for rendering to a multichannel computing program transmission operations interface; and receiving the first multichannel computing program transmission setting or the second multichannel computing program transmission setting via the multichannel computing program transmission setting interface component.

17. The method of claim 13, wherein the plurality of multichannel computing programs comprises at least one of an object orchestration multichannel computing program, a technology operations multichannel computing program, or a software development multichannel computing program.

18. The method of claim 13, wherein to generate the first multichannel computing program transmission control or the second multichannel computing program transmission control comprises:

generating, using the multichannel computing program operational graph structure, a set of multichannel computing program transmission control factors; and generating the first multichannel computing program transmission control or the second multichannel computing program transmission control based on at least one of the set of multichannel computing program transmission control factors.

19. The method of claim 18, wherein the set of multichannel computing program transmission control factors comprises a multichannel computing program transmission priority control factor and wherein to generate the multichannel computing program transmission priority control factor comprises applying a multichannel computing program entity operational item of the multichannel computing program operational graph structure to a transmission priority control model.

20. A computer program product for outputting a first multichannel computing program transmission package and a second multichannel computing program transmission package, the computer program product comprising at least one non-transitory computer-readable storage medium having computer-readable program code portions stored therein, the computer-readable program code portions comprising an executable portion configured to:

receive a first multichannel computing program transmission setting for a first multichannel computing program of a plurality of multichannel computing programs and a second multichannel computing program transmission setting for a second multichannel computing program of the plurality of multichannel computing programs;

receive a set of multichannel computing program operational transmissions, wherein a first multichannel computing program operational transmission of the set of multichannel computing program operational transmissions is received from the first multichannel computing program and a second multichannel computing program operational transmission of the set of multichannel computing program operational transmissions is received from the second multichannel computing program;

identify a multichannel computing program operational action event associated with at least one of the plurality of multichannel computing programs;

generate, using a multichannel computing program operational graph structure and a composite multichannel computing program transmission package configuration model, a first multichannel computing program transmission control for the first multichannel computing program based on the multichannel computing program operational action event and a second multichannel computing program transmission control for the second multichannel computing program based on the multichannel computing program operational action event;

generate the first multichannel computing program transmission package for the first multichannel computing program based on the first multichannel computing program transmission setting and the first multichannel computing program transmission control and the second multichannel computing program transmission package for the second multichannel computing program based on the second multichannel computing program transmission setting and the second multichannel computing program transmission control; and output the first multichannel computing program transmission package to the first multichannel computing program and the second multichannel computing program transmission package to the second multichannel computing program, wherein the first multichannel computing program transmission package configures the first multichannel computing program to transmit a first multichannel computing program transmission object via a first multichannel computing program transmission channel of a plurality of multichannel computing program transmission channels and the second multichannel computing program transmission package configures the second multichannel computing program to transmit a second multichannel computing program transmission object via a second multichannel computing program transmission channel of the plurality of multichannel computing program transmission channels.

* * * * *